US010278343B2

(12) United States Patent
Nakajima et al.

(10) Patent No.: US 10,278,343 B2
(45) Date of Patent: May 7, 2019

(54) HYDROPONICS PROCESSES WITH HIGH GROWTH RATES

(71) Applicant: Bras Avancer LLC, San Jose, CA (US)

(72) Inventors: Masaru Nakajima, Tokyo (JP); Taro Yamazaki, Los Gatos, CA (US)

(73) Assignee: Bras Avancer LLC, San Jose, CA (US)

( * ) Notice: Subject to any disclaimer, the term of this patent is extended or adjusted under 35 U.S.C. 154(b) by 639 days.

(21) Appl. No.: 14/722,135

(22) Filed: May 26, 2015

(65) Prior Publication Data

US 2015/0342133 A1 Dec. 3, 2015

Related U.S. Application Data

(60) Provisional application No. 62/002,912, filed on May 26, 2014.

(51) Int. Cl.
*A01G 31/02* (2006.01)
*A01G 31/06* (2006.01)

(52) U.S. Cl.
CPC .............. *A01G 31/02* (2013.01); *A01G 31/06* (2013.01); *Y02P 60/216* (2015.11)

(58) Field of Classification Search
CPC ........ A01G 1/001; A01G 7/045; A01G 31/00; A01G 31/02; A01G 31/06; A01G 2031/003; A01G 2031/007
See application file for complete search history.

(56) References Cited

U.S. PATENT DOCUMENTS

| | | | | |
|---|---|---|---|---|
| 3,608,238 A * | 9/1971 | Reuter | ................. | A01G 31/001 47/64 |
| 3,835,584 A * | 9/1974 | Shimazu | ............... | A01G 9/1086 211/60.1 |
| 3,877,172 A * | 4/1975 | Schwab | ............... | A01G 31/001 47/64 |
| 3,927,491 A * | 12/1975 | Farnsworth | ............ | A01G 31/02 47/63 |
| 3,961,445 A * | 6/1976 | Rack | ...................... | A01G 9/102 264/321 |
| 3,973,355 A * | 8/1976 | McKenzie | ........... | A01G 9/1086 47/57.6 |
| 4,034,506 A * | 7/1977 | Kasahara | ............. | A01G 31/001 47/64 |
| 4,037,360 A * | 7/1977 | Farnsworth | ............ | A01G 31/02 47/63 |

(Continued)

*Primary Examiner* — Monica L Williams
*Assistant Examiner* — Michael A. Fabula
(74) *Attorney, Agent, or Firm* — patent2ip LLC; Tue Nguyen

(57) ABSTRACT

A system and method for a hydroponics farm comprising a light source, a container filled with a liquid medium, a plate support positioned above the container comprising a foam support, wherein the foam support supports a plant at a stem portion. The foam supports may allow ease of transfer of the plants among a plurality of plate supports. The system and method may comprise exposing an upper portion of a plant root to ambient air while a tip of the root is in contact with the liquid medium to obtain nutrients. The system and method may also comprise periodically raising the level of the liquid medium, spreading a plant density, and oscillating the plant to promote growth.

13 Claims, 19 Drawing Sheets

(56) References Cited

U.S. PATENT DOCUMENTS

| | | | | |
|---|---|---|---|---|
| 4,058,931 A * | 11/1977 | Vestergaard | | A01G 9/104 47/64 |
| 4,279,101 A * | 7/1981 | Leroux | | A01G 31/02 47/64 |
| 4,312,152 A * | 1/1982 | Drury | | A01G 31/02 47/62 R |
| 4,328,641 A * | 5/1982 | Tesch | | A01G 31/00 47/59 R |
| 4,355,484 A * | 10/1982 | Mandish | | A01G 31/02 47/63 |
| 4,382,348 A * | 5/1983 | Kitsu | | A01G 31/02 47/39 |
| 4,513,533 A * | 4/1985 | Gething | | A01G 31/045 47/63 |
| 4,586,288 A * | 5/1986 | Walton | | A01G 9/104 47/73 |
| 4,607,454 A * | 8/1986 | Koike | | A01G 31/001 47/61 |
| 4,669,217 A * | 6/1987 | Fraze | | A01G 31/001 47/59 R |
| 4,777,763 A * | 10/1988 | Shannon | | A01G 31/001 47/64 |
| 5,218,783 A * | 6/1993 | Langezaal | | A01G 9/104 47/64 |
| 5,261,185 A * | 11/1993 | Koide | | A01G 31/02 47/63 |
| 6,088,958 A * | 7/2000 | Oka | | A01G 31/02 47/58.1 R |
| 6,105,309 A * | 8/2000 | Takayanagi | | A01G 31/02 47/62 A |
| 6,233,870 B1 * | 5/2001 | Horibata | | A01G 31/02 47/59 R |
| 6,263,615 B1 * | 7/2001 | Hirose | | C05D 3/02 119/246 |
| 7,448,163 B2 * | 11/2008 | Beeman | | A01G 9/00 47/60 |
| 8,327,579 B2 * | 12/2012 | Kania | | A01G 31/00 47/59 R |
| 8,549,788 B2 * | 10/2013 | Bryan, III | | A01G 31/02 47/62 C |
| 2007/0000170 A1 * | 1/2007 | Hempenius | | A01G 31/02 47/64 |
| 2010/0064583 A1 * | 3/2010 | Dundas | | A01G 31/02 47/59 S |
| 2011/0010991 A1 * | 1/2011 | Fujii | | A01G 9/104 47/66.7 |
| 2012/0036773 A1 * | 2/2012 | Khoo | | A01G 9/00 47/65.7 |
| 2012/0085026 A1 * | 4/2012 | Morris | | A01G 31/02 47/62 A |
| 2013/0232872 A1 * | 9/2013 | Bryan | | A01G 31/02 47/62 C |
| 2014/0215920 A1 * | 8/2014 | Kuo | | A01G 31/02 47/62 R |
| 2015/0216131 A1 * | 8/2015 | Van Wingerden | | A01G 9/1026 47/59 R |
| 2015/0327451 A1 * | 11/2015 | Koyama | | A01K 63/003 47/62 R |
| 2016/0029580 A1 * | 2/2016 | Sakai | | A01G 31/02 47/62 R |
| 2016/0198652 A1 * | 7/2016 | Yano | | A01G 31/02 47/62 R |
| 2016/0198653 A1 * | 7/2016 | Kato | | A01G 31/02 47/60 |
| 2016/0212953 A1 * | 7/2016 | Janssen | | A01G 9/025 |
| 2016/0262324 A1 * | 9/2016 | Yamane | | A01G 31/06 |
| 2017/0105358 A1 * | 4/2017 | Wilson | | A01G 7/045 |
| 2017/0127627 A1 * | 5/2017 | Miyabe | | A01G 31/06 |
| 2017/0172084 A1 * | 6/2017 | Fox | | A01G 31/06 |

\* cited by examiner

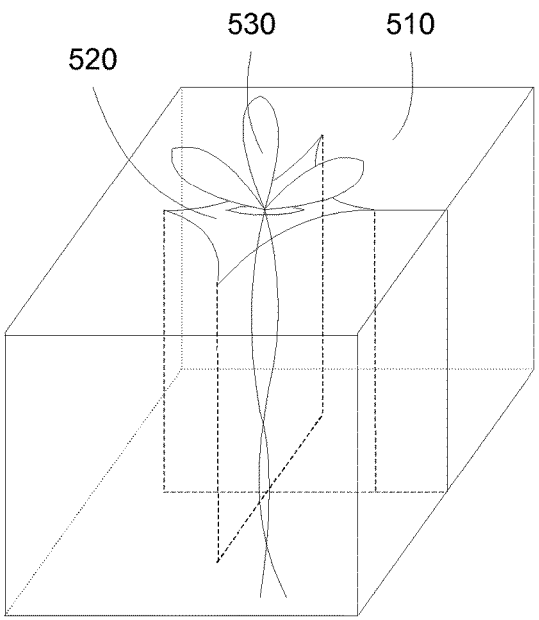
Fig. 5A
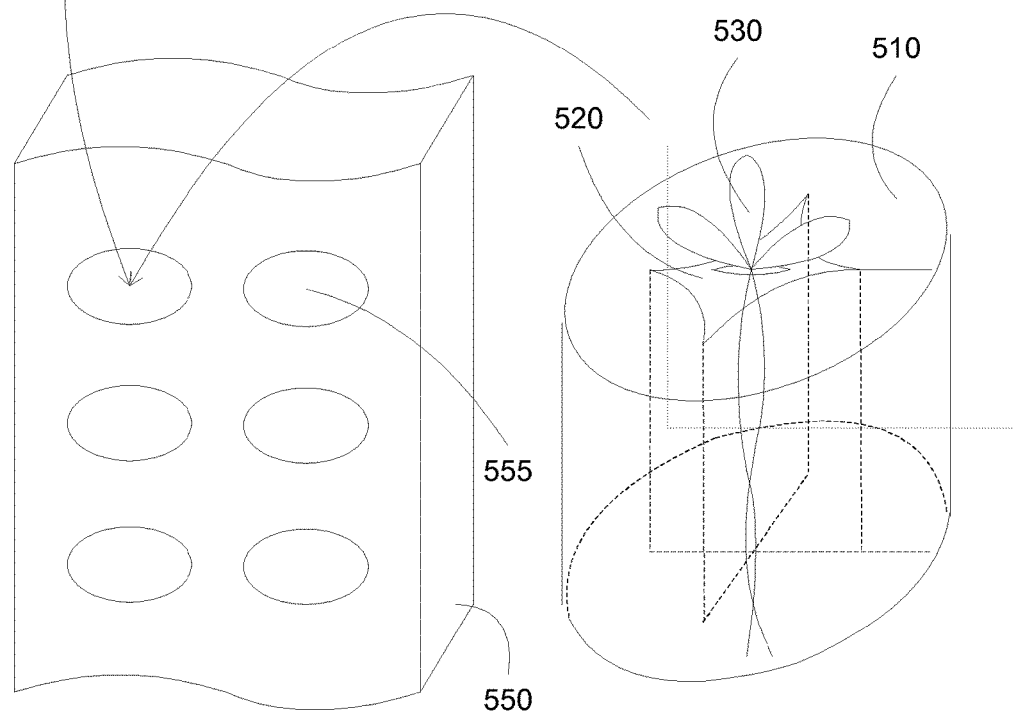
Fig. 5B
Fig. 5C

Periodically swinging plant roots
1500

Fig. 15A

Periodically oscillating liquid sideway
1520

Fig. 15B

Periodically draining through a siphon tube
1540

Fig. 15C

HYDROPONICS PROCESSES WITH HIGH GROWTH RATES

This patent application claims priority from U.S. provisional patent application Ser. No. 62/002,912, filed on May 26, 2014, entitled "Hydroponics processes with high growth rates".

The present invention relates to hydroponics growing systems methods.

BACKGROUND

Hydroponics techniques can be used to raise vegetables and fruits. Hydroponics plants can grow from liquid medium, e.g., without any requirements for soil. The hydroponics plants can absorb water and nutrients through the plant roots from the nutrient solution in a hydroponics tank. Thus hydroponics systems can raise plants without any agricultural pesticides, together with 3-D plant configuration as compared to traditional soil farming.

It is desirable to provide a hydroponics system with improved yield and less consumable usages.

SUMMARY OF THE EMBODIMENTS

In some embodiments, provided are systems and methods for a hydroponics farm, which can potentially reduce consumables and improve product yield.

The hydroponics plants can be manually spread to avoid leaf overlap, allowing the plants to achieve maximum growth potential. The spreading of plants can minimize the light intensity, reducing power consumption and system weight. The spreading of plants can be facilitated by using flexible foam supports for the hydroponics plants, which can allow ease of plant transfer.

The roots of the hydroponics plants can be exposed to air, including oxygen and $CO_2$, which can provide nutrition and stimulate plant growth. Liquid nutrition can wet the tips of the roots of the hydroponics plants, leaving other portions of the roots exposed to the ambient. Periodically, the level of the liquid nutrition can raise to completely wet the roots.

The roots of the hydroponics plants can move, e.g., swinging back and forth, which can promote plant growth. The swinging action can be provided by periodically oscillating the liquid nutrition, such as draining through a siphon mechanism.

BRIEF DESCRIPTION OF THE DRAWINGS

FIGS. 5A-5C illustrate sponge supports for plants according to some embodiments.

FIGS. 15A-15C illustrate flow charts for hydroponics roots swinging according to some embodiments.

DETAILED DESCRIPTION OF THE EMBODIMENTS

Figure 1A:
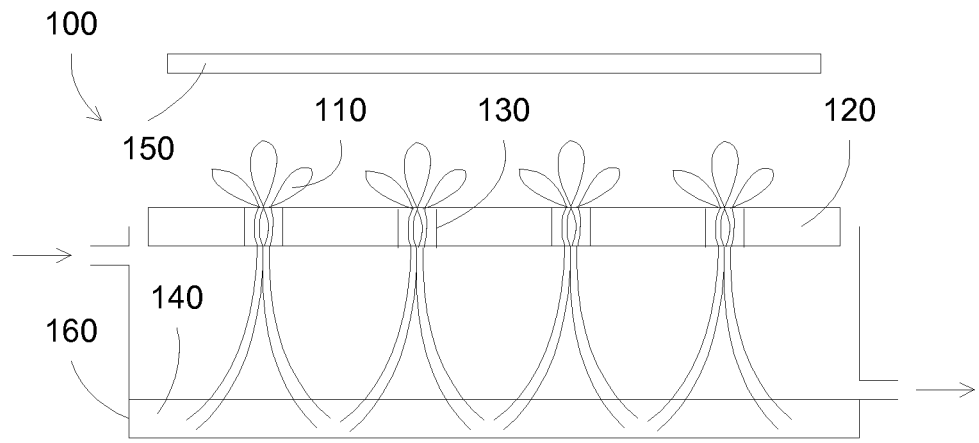
FIGS. 1A-1B illustrate hydroponics systems according to some embodiments.

In some embodiments, the present invention discloses hydroponics systems and methods to produce plants in a short time, including vegetable such as lettuce, using small amount of water and small amount of light.

In some embodiments, the present invention discloses methods and systems for growing hydroponics plants with improved yield and less capital costs and consumable. Flexible foam supports can be used to support the hydroponics plants, allowing ease of transferring of the hydroponics plants. With the plants transferable, plant spreading can be easily performed, leading to faster growth with less consumables such as lower light intensity. The hydroponics plants can have a portion of the roots exposed to the ambient, for example, to air and $CO_2$, to promote plant growth. The tips of the roots can be dipped in the liquid, for example, for supply liquid nutrition to the plants. The low levels of the liquid nutrition, e.g., only enough to wet the tips of the plant roots, can lower the consumption of water. Low water usage and low light intensity can lower the weight of the plant support structure, allowing high stacking of hydroponics plant shelves for low foot print. In addition, the plant roots can periodically swing, for example, by creating water waves at the root tips. The swinging of the root tips can stimulate the growth of the plants, which can shorten the plant maturity time and improve plant yield.

For example, by cycling a water supply level so that water can alternatively wet (e.g., high water level) and expose a portion of the roots to outside air (e.g., low water level), small amount of water can be used in the hydroponics system. The allocation of high and low water levels can be programmed to minimize the total weight of the hydroponics shelves, for example, one shelf having high water level and all other shelves having low water level. In some embodiments, the term "water" can include water without nutrients and water with nutrients such as dissolving fertilizers or mineral elements. By spreading the plants so allow minimum overlap of plant leaves, small amount of light can be used in the hydroponics system.

Basic elements of hydroponics systems can include a reservoir filled with a nutrient solution and a container as a growing medium for the plants. The nutrient solution can be supplied to the container, and the plant roots can absorb the nutrient solution and use it in the growing process of the plant. For example, the plants can require carbon dioxide, water, light, and mineral elements to grow. The mineral elements can be included in the nutrient solution, which can be absorbed by the plant through its roots. The growth of the plants can be directly related to the amount of light, water and carbon dioxide, together with the absorption of mineral nutrient by the plant's roots. The mineral nutrients in the liquid solution can include nitrogen, phosphorus, potassium, calcium, magnesium, sulfur, silicon, boron, copper, iron, chloride, manganese, molybdenum, sodium, selenium, nickel, zinc, or any combination thereof.

Figure 1B:
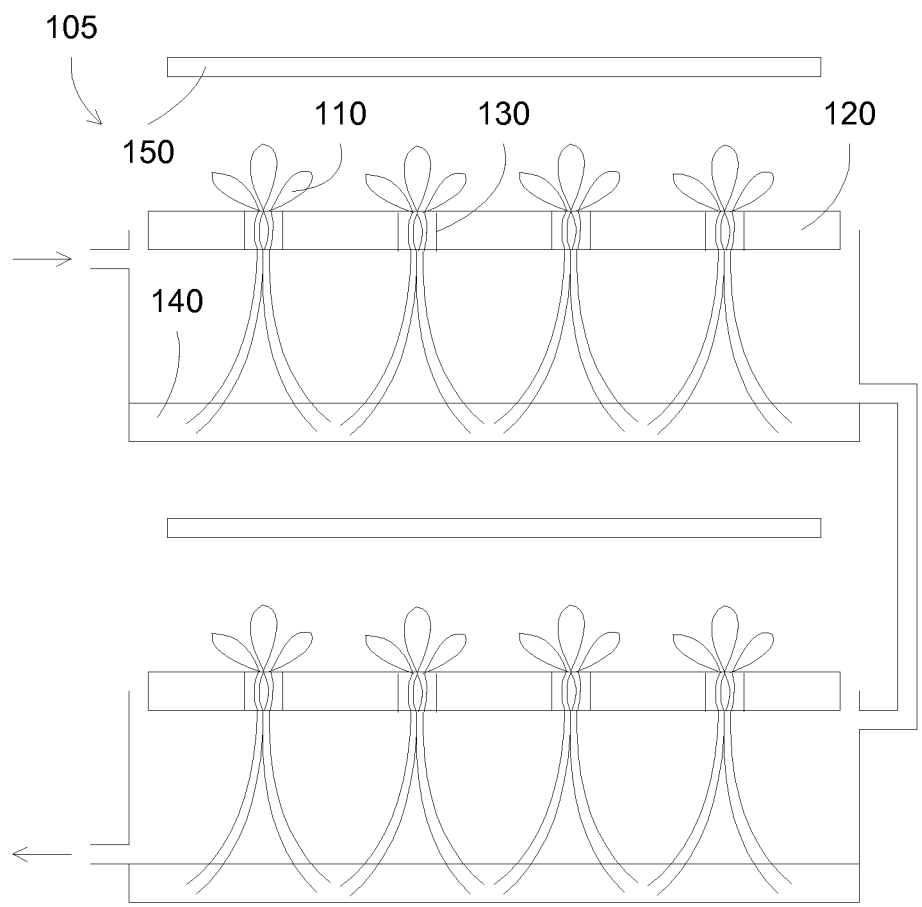

FIGS. 1A-1B illustrate hydroponics systems according to some embodiments. In FIG. 1A, a hydroponics system 100 can include a container 160 partially filled with liquid, e.g., water 140, and dissolved nutrients. Hydroponics plants 110 can be supported by support elements 130 in a support structure 120. The hydroponics plants 110 can receive nutrients from liquid 140, together with light from light source 150.

FIG. 1B shows a vertical hydroponics system 105 having multiple hydroponics shelves. Each shelf can include a container partially filled with liquid 140 and dissolved nutrients. Hydroponics plants 110 can be supported by support elements 130 in a support structure 120. The hydroponics plants 110 can receive nutrients from liquid 140, together with light from light source 150. Liquid 140 can travel from top shelf to bottom shelf, for example, by gravity.

In some embodiments, the present invention discloses improved hydroponics methods and systems. Hydroponics is a method of growing plants using a liquid growing medium, in place of soil, in which plant nutrients are dissolved. The roots of the plants absorb nutrients in the liquid medium to grow. Supports for the plants can be included to hold the plants upright.

In some embodiments, the present invention discloses supports for the hydroponics plants that can allow rapid plant growth. The supports can include flexible foam or sponge that hold the stems of the plants. The flexible foam or sponge can hold liquid for maintaining plant wetting. The flexible foam or sponge can allow movements of the plant roots, for example, due to the waves or movements of the liquid medium. The movements of the plant roots can stimulate the plant growth. The flexible foam or sponge can allow ease of plant transfer, for example, for spreading the plants to reduce the plant density for faster plant growth.

In some embodiments, the plant seeds can be germinated in small sponge supports. After the seeds are germinated, the small sponge supports, together with the small plants, can be transferred to larger sponge supports. The larger sponge supports can support the plants at the stem portions, allowing ease of transfer and swinging of plant roots.

Figure 2A:
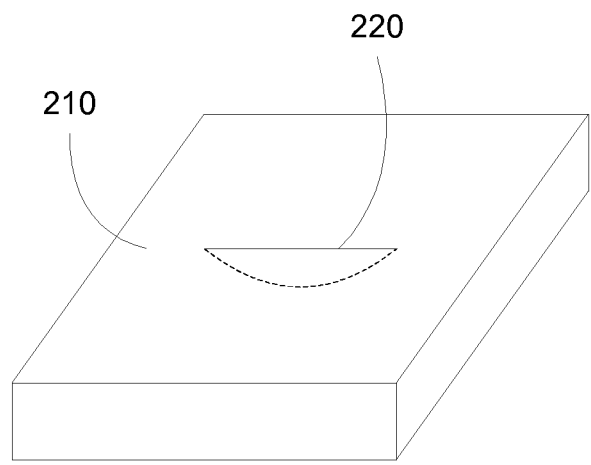
FIGS. 2A-2B illustrate a germination process for plant seeds according to some embodiments.
Figure 2B:
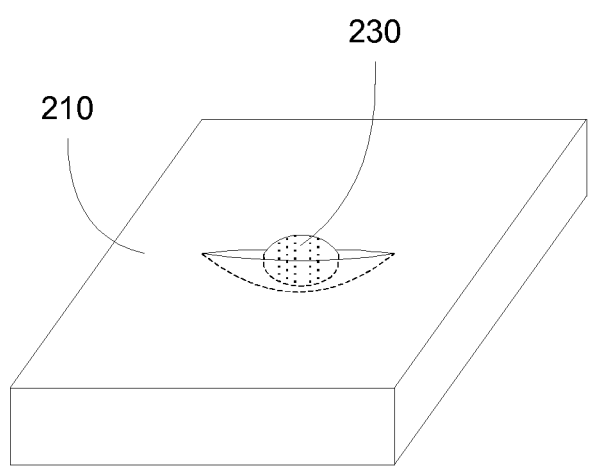

FIGS. 2A-2B illustrate a germination process for plant seeds according to some embodiments. A small flexible foam or sponge 210 can have a cut 220 in a top surface. A plant seed 230 can be placed in the pocket formed by the cut 220. The sponge 210 can be between 0.5 to 1 cm height and between 1 to 2 cm in width. Other dimensions can be used, for example, to accommodate different seed sizes.

Figure 3A:
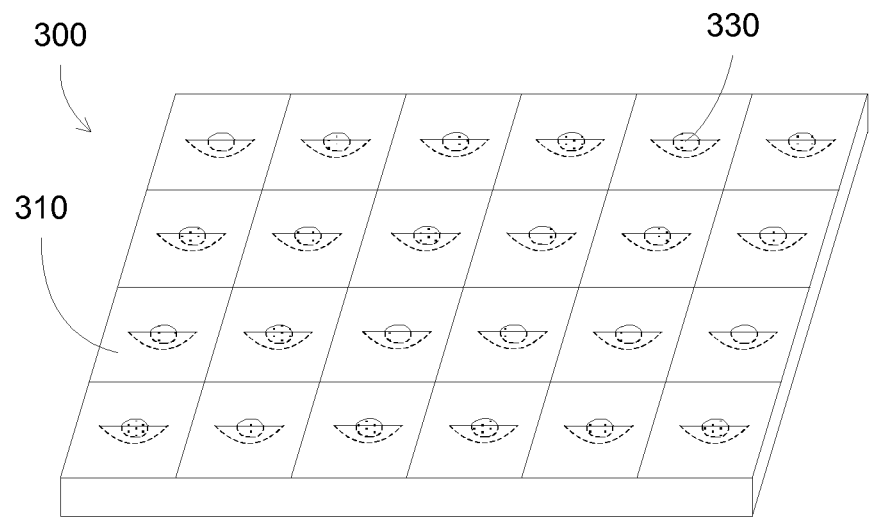
FIGS. 3A-3C illustrate another germination process for plant seeds according to some embodiments.
Figure 3B:
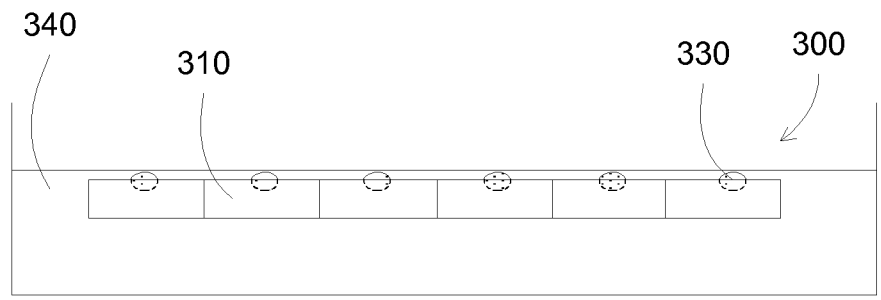
Figure 3C:
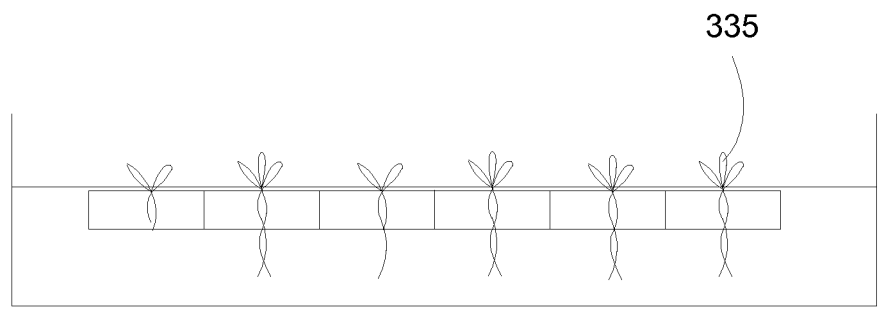

FIGS. 3A-3C illustrate another germination process for plant seeds according to some embodiments. A sheet 300 of multiple sponge supports 310 can be used to hold plant seeds 330. The sponge sheet 300 can be placed in a liquid medium 340, for example, a water bath having dissolved nutrients. After a few days, the seeds can germinate to become small plants 335. Some plants can be weak, and can be removed. Strong plants, e.g., longer roots and/or showing vigorous vitality, can be moved to larger sponge supports.

Figure 4A:
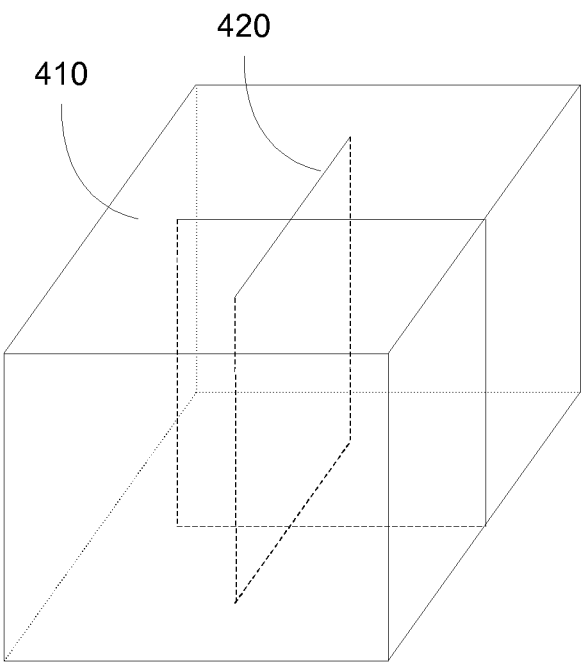
FIGS. 4A-4B illustrate large sponge supports for plants according to some embodiments.
Figure 4B:
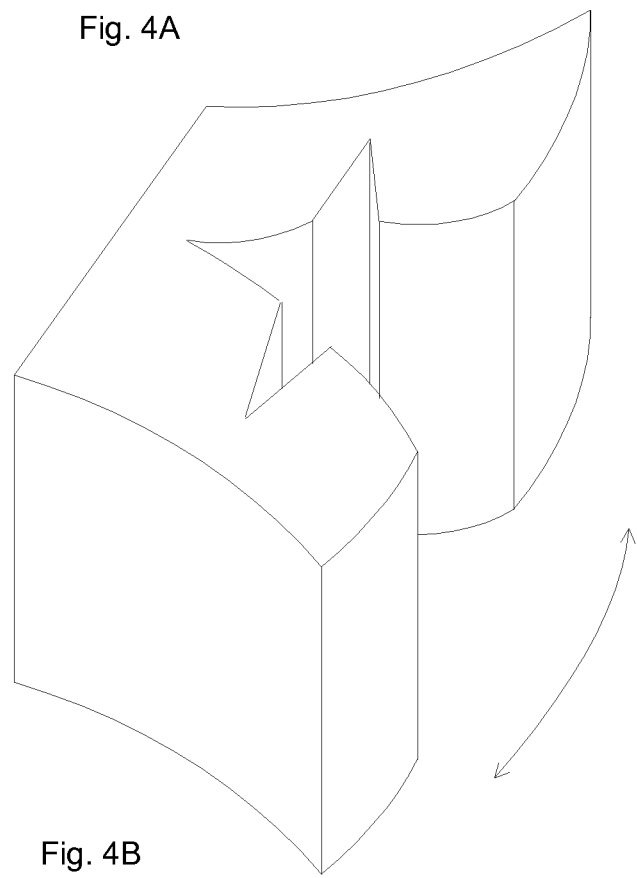

FIGS. 4A-4B illustrate large sponge supports for plants according to some embodiments. A sponge support 410 can have cuts or slits 420. The cuts can be configured to accept a small sponge having the germinated seed plant. The sponge 410 can be between 2 to 41 cm height and between 2 to 4 cm in width. Other dimensions can be used, for example, to accommodate different small sponge sizes.

FIGS. 5A-5C illustrate sponge supports for plants according to some embodiments. A small sponge 520 with a germinated seed plant 530 can be placed inside a large sponge 510. The large sponge 510 can be cut in a way to facilitate the insertion of the small sponge, for example, with a slit at a side and cross cuts at the center (see FIGS. 4A and 4B). Since the small sponge 520 and the large sponge 510 are flexible, e.g., compressible, the small sponge 520 can be inserted within the large sponge. Other materials can be used for the sponge supports 510 and 520, as long as these supports are compressible for ease of being combined. After being combined, the germinated plant 530 can be supported by the sponge support 510/520.

The sponge support 510/520 can provide a support to the stem of the plant 530, and can act as an anchor to facilitate the movements of the plant roots. The root movements at the stem portion of the plants can lead to movements of the stem, which can enhance the plant growth. Other stem supports can be used, which can hold the stem portion of the plants to allow movement of the roots and/or the stem. The sponge support 510/520 can also facilitate the transfer of the plants, for example, by allowing a person to hold the sponge support to move the plant, e.g., leaves, roots, and all other parts of the plants, to different locations.

After moving the germinated plant 530 to the large sponge support 510, the plant 530 and the supports (e.g., 510 and 520) can be placed in a plate support 550. The plate support can be made of solid materials, such as plastic or hard foam such as polystyrene foam. The plate support 550 can have multiple holes 555, which can accept the sponge support 510/520. The hole 555 can be smaller than the sponge support 510/520 in order to provide pressure to the sponge support for holding the sponge support in place. For example, the sponge support 510/520 can have a square cross section, and the hole 555 can have a circular cross section. The sponge support 510/520 can be compressed, e.g., squeezed, to fit into the hole 555. Other cross sections can be used, as long as the cross section of the hole is smaller than that of the sponge support. Further, the sponge support can be made of compressible materials, such as sponge or flexible foam, which can allow the sponge support to be squeezed into a smaller opening.

The thickness of the plate support can be smaller than the height of the sponge support, so that at least a portion of the sponge support can protrude from the plate support. The sponge support can protrude from the plate support at the root side.

Figure 6:
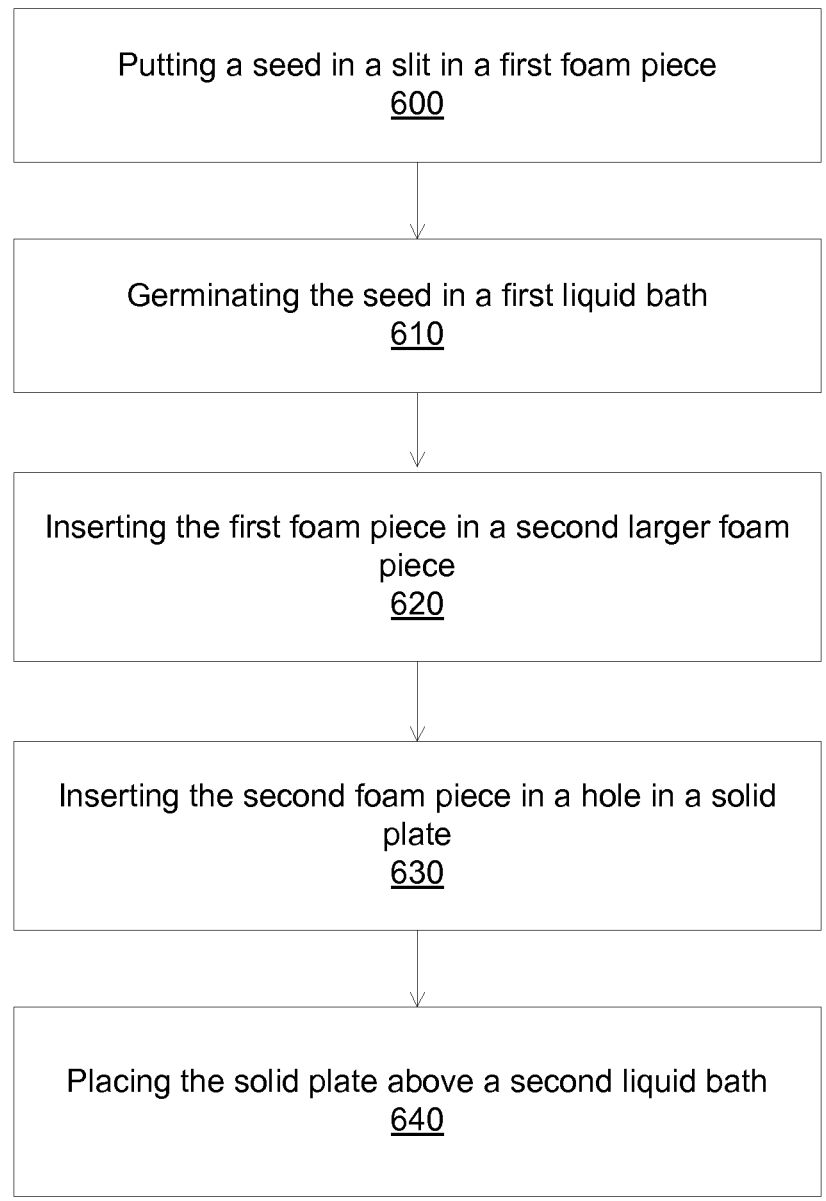
FIG. 6 illustrates a flow chart for preparing a plant support according to some embodiments.

FIG. 6 illustrates a flow chart for preparing a plant support according to some embodiments. The plant supports can protect the stem and a portion of the roots from being dried, for example, by having a water retention material such as a porous materials such as sponge or flexible foam. The plant supports can provide a handle for ease of plant transfer, for example, by holding the plant support, the plant can be moved to different places without root or leaf damaging. The plant supports can allow the roots and stem to swing, for example, by providing a handle support at the stem portion of the plant.

In operation 600, a first foam piece is prepared. The first foam piece can be a flexible, porous, or compressible material, such as a flexible porous foam or a sponge. The first foam piece can retain water. The first foam piece can have a slit on a top surface. A plant seed can be placed in the slit of the first foam piece. In some embodiments, a foam sheet can be prepared having multiple separation cuts to form multiple first foam pieces. The foam sheet can also have multiple cuts in each foam piece. Multiple seeds can be placed to the foam sheet, with each seed in a cut pocket of a foam piece.

The use of foam pieces can allow a better germinated plant selection, since each seed can be germinated into a separate plant. The germinated plant selection can be based on each seed capability to be germinated into a healthy plant. The foam piece use can have advantages over prior art seed selections in which multiple seeds, e.g., 3 seeds, can be germinated in a same place followed by the termination of weaker germinated plants. The prior art selection can be wasteful, for example, by the termination of multiple perfectly healthy plants, in order to preserve the best plant.

In operation 610, the seeds in the foam pieces, such as the foam sheet, are germinated. For example, the foam sheet can be placed in a first liquid bath, such as a water bath. Nutrient elements can be added to the liquid bath. The liquid bath can be placed under appropriate conditions for seed germination, such as temperature, humidity and light.

After the seeds are germinated, the healthy plants can be selected to the next step while the weak plants can be removed. The selection can be based on the appearance of the plants, the length of the roots, the number of leaves, or the size of the leaves.

In operation 620, the selected plants can be transferred to second foam pieces. To avoid damaging to the plants, the first foam pieces are moved together with the plants. The first foam pieces can be placed inside the second foam pieces, which are larger than the first foam pieces. In some embodiments, a first foam piece is separated from a first foam sheet, for example, at the separation cuts. A second foam piece can be separated from a second foam sheet, prepared similar to the first foam sheet. The second foam piece can be open, and the first foam piece can be squeezed into the second foam piece.

In operation 630, the second foam piece, e.g., including the plant and the first foam piece, can be inserted in a hole in a plate support. The second foam piece can be squeezed to fit into the hole, for example, to ensure a press fit. The density of the holes in the plate support can be adequate for the germinated plants, e.g., a high density of between 4 and 900 $cm^{-2}$, or between 4 and 100 $cm^{-2}$, e.g., a lateral separation of the holes can be between 2 and 30 cm, or between 2 and 10 cm.

In operation 640, the plate support can be a solid plate, which can be placed over a hydroponics liquid medium such as on a hydroponics container. With light, water and nutrients, the plants can grow in a hydroponics process.

In some embodiments, the present invention discloses hydroponics systems and methods that include spreading the plants as they grow to minimize leaf overlap. The plant density of the hydroponics systems can be reduced as the plants grow, for example, to allow rooms for the plants to grow. The leaf density of the hydroponics systems can be somewhat constant, e.g., as the plants grow, the leaves of the plants become larger and require more room to spread. By keeping a leaf density constant, the plants can receive adequate room to grow and light for photosynthesis, e.g., the leaves are not crowded and shaded each other.

In some embodiments, the plant supports can ease the transfer of the plants. For example, by supporting a portion of the stem, the plants can be handle without or with minimum damage to the roots or the leaves. A sponge support can be allow the removal and insertion of the sponge support to the plate support, for example, by press fit.

In some embodiments, the spreading of the plants can be performed manually, e.g., by an operator who manually removes the plants from one plate support and then transfers the plants to another plate support with reduced density. The spreading of the plants can allow the plants to achieve maximum growth potential. The spreading of plants can also minimize the light intensity, reducing power consumption and system weight.

In some embodiments, the plant density can be reduced during the movements along the shelves. The plant density can be determined by a minimal leaf overlap. For example, young plants can have smaller leaves, thus a high plant density, such as 1 plant per 10 $cm^2$ or 1 plant per 20 $cm^2$, can be achieved. Mature plants can have larger leaves, thus a lower plant density, such as 1 plant per 100 $cm^2$ or 1 plant per 200 $cm^2$, can be used.

In some embodiments, the amount of the light source can be at 10,000 lux or less. The present hydroponics system can use a low light intensity with high plant yield. The low light intensity can reduce power consumption, and can reduce the weight of the light source. With the addition of sunlight, lower light intensity can be used.

In some embodiments, the spreading density can be selected to retain the plant yield per cultivation area. The spreading of plants can allow faster plant grow, which can improve the yield of plant harvested. Thus, even though the plants are spread over a larger area, the harvest yield per unit area can remain substantially the same, allowing a reduction in consumable consumption per weight of plants.

Figure 7A:
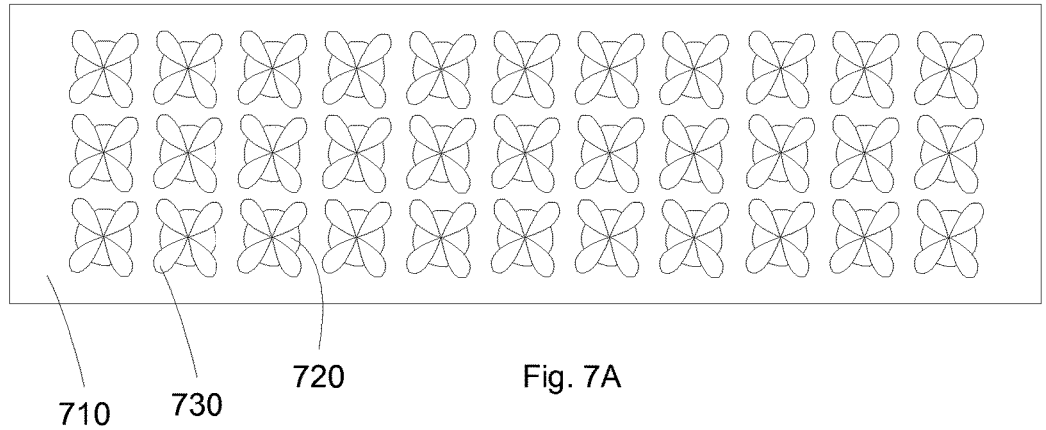
FIGS. 7A-7C illustrate a plant spreading operation according to some embodiments.
Figure 7B:
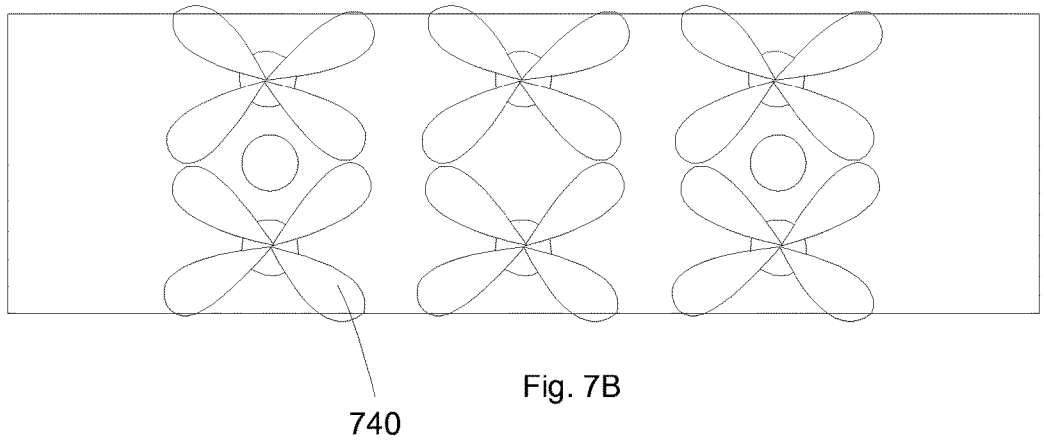
Figure 7C:
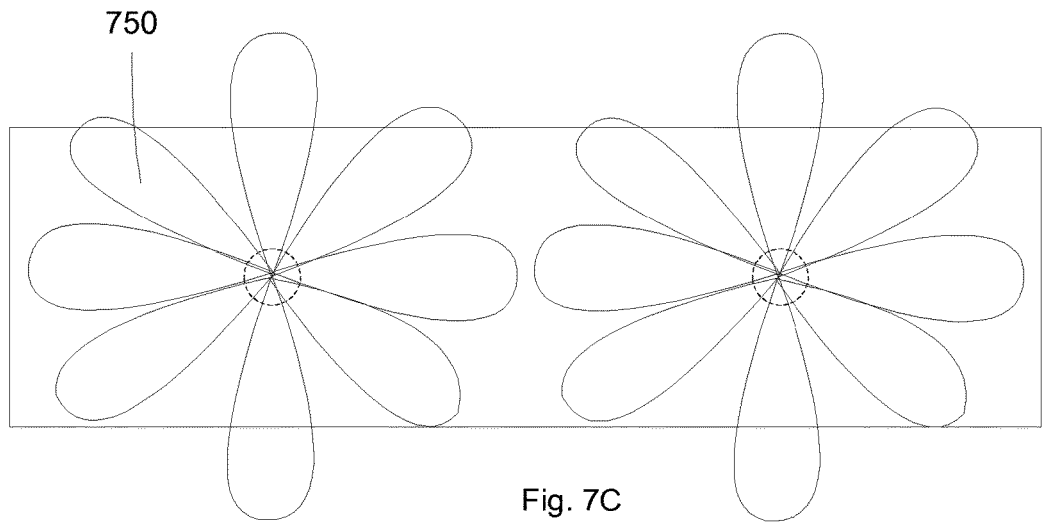

FIGS. 7A-7C illustrate a plant spreading operation according to some embodiments. In FIG. 7A, the plants 730 can be first transferred to the plate support 710. For example, the plants can be the germinated plants that have been transferred from small sponge supports to large sponge supports. The large sponge supports can be squeezed into the holes 720 in the plate support 710. The hole density of the plate support 710 can be high, for example, so that the leaves of the germinated plants 730 have a small separation. For example, a germinated plant can have leaf size of about 1 to 2 cm, so the hole separation in the plate support can be about 2 to 5 cm, or a plant or hole density of about 4 to 25 $cm^{-2}$. After the plants grow to a larger size, e.g., when the leaves start to overlap, the plants can be spread out to a larger area.

In FIG. 7B, the plants 740 can be spread so that the leaves do not overlap. The plants can be handled by the sponge supports 720 at the stem of the plants when transfer. In FIG. 7C, the plants 750 can be further spread.

In some embodiments, the plants can be moved along the shelf. For example, early plants can be placed on the left side of the shelf, and gradually moved to the right. The movement of the plants can facilitate shipping, since the mature plants can be ready from one side of the shelves.

Figure 8A:
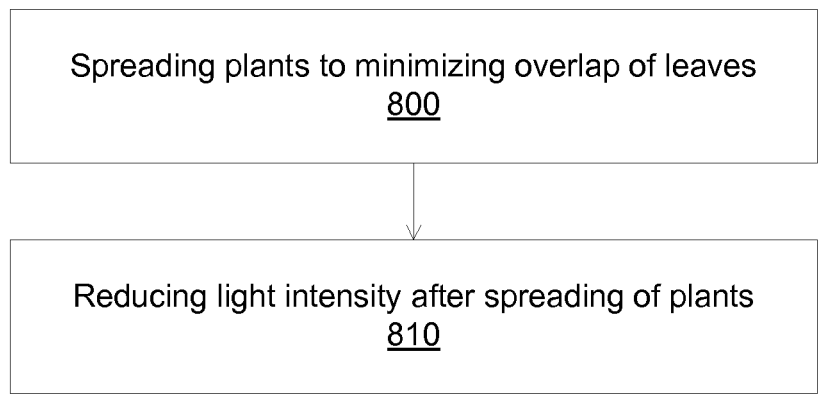
FIGS. 8A-8B illustrate flow charts for spreading plants according to some embodiments.
Figure 8B:
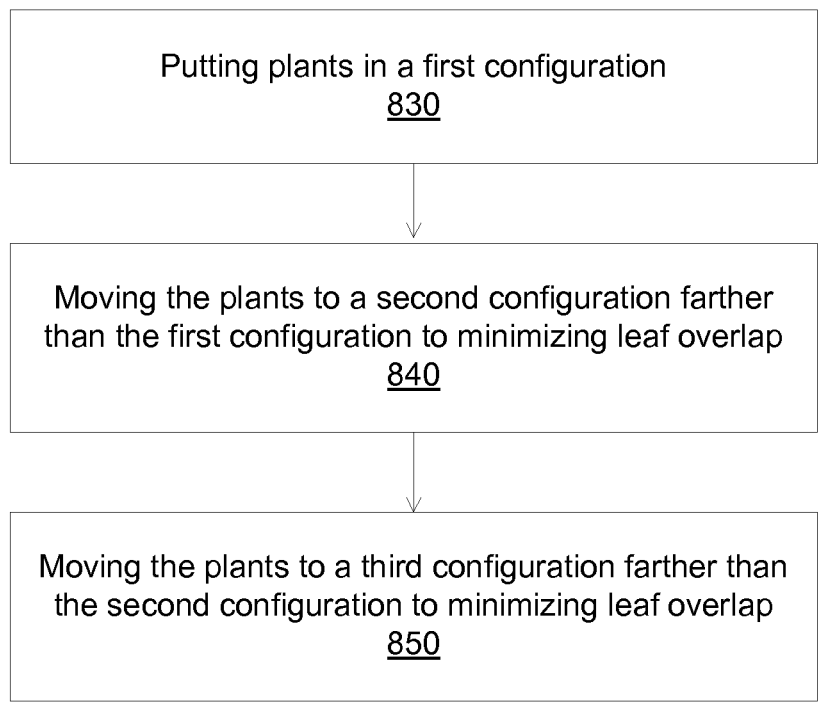

FIGS. 8A-8B illustrate flow charts for spreading plants according to some embodiments. The plant spreading can reduce the light intensity, leading to lower power consumption. The plant spreading can enhance the plant growth, due to less space competition of the plant leaves. The amount of the spreading of the plants can be selected to maximize the plant yield. For example, to maximize a plant yield without space concern, the plants can be spread out as much as possible, for example, to achieve the maximum growth rate of the plants. To maximize a plant yield per unit cultivation area, the plants can be spread out as long as the growth rate exceeds the additional required space, e.g., to achieve a balance between the growth rate of the plants and the floor space required.

In FIG. 8A, operation 800 spreads out the plants. The criterion for spreading the plants can be based on the minimization of leaf overlap, or can be based on a balance between plant growth and required space. Operation 810 reduces the light intensity to suit the new plant configuration. The light intensity reduction is in relation to the original plant configuration, e.g., the configuration of plants without the spreading. In some embodiments, after the plants grow and cause leaf overlap, high light intensity can be required to sustain a plant growth. By spreading the plants, the light intensity can remain the same. The spreading of plants can reduce the power consumption while still maintaining a fast plant growth.

In FIG. 8B, operation 830 configures the plants in a first configuration. For example, after germinating the seeds, the germinated plants can be placed in a plate support with a dense configuration, such as the plants close to each other without leaf overlap. Operation 840 moves the plants to a second configuration that has lower plant density than the first configuration. The second configuration can be a configuration that minimize leaf overlap. The second configuration can be a configuration that maximize a plant yield per unit area, e.g., a balance between the faster growth rate due to low plant density and the low per-unit-area yield due to the additional space required for spreading the plants. Operation 840 repeats the plant movements, moving the plants to a third configuration that has lower plant density than the second configuration.

In some embodiments, the present invention discloses hydroponics systems and methods that include exposing a portion of the roots of the plants to an air ambient. The exposed portion of the roots can be periodically wetted.

In some embodiments, when a portion of the roots of the plant are exposed to air, the tips of the roots can contact the water. The water level can be fixed, e.g., a constant portion of the roots is exposed. The water level can be adjusted, e.g., only the root tips are wet with the longer exposed portion of roots for longer roots.

In some embodiments, the time for exposing the plant roots can be 10× to 25× the time for wetting the plant roots. For example, the wetting time can be 2-5 minutes, and the root exposing time can be 20-125 minutes, such as 20-100 minutes or 40 to 60 minutes.

In some embodiments, the tips of the plant roots can be dipped in the liquid medium, leaving the roots portion from the tips to the stem exposed to air ambient. The exposed roots can absorb oxygen and $CO_2$, causing the plant to grow faster. For example, air roots, e.g., roots of the plant that are exposed to air, can grow out of the plant seeking air above the liquid medium. By exposing a portion of the plant roots, this can simulate the air root behavior, which can significantly enhance plant growth. The exposed root portion can also be periodically wetted to prevent root drying and to obtain liquid nutrients. The exposure of a portion of the roots can increase absorption of oxygen and/or $CO_2$ in the plant roots, together with providing movements of the plant roots to stimulate the plant growth, such as facilitating a substantial increase in the rate of plant growth.

Figure 9A:
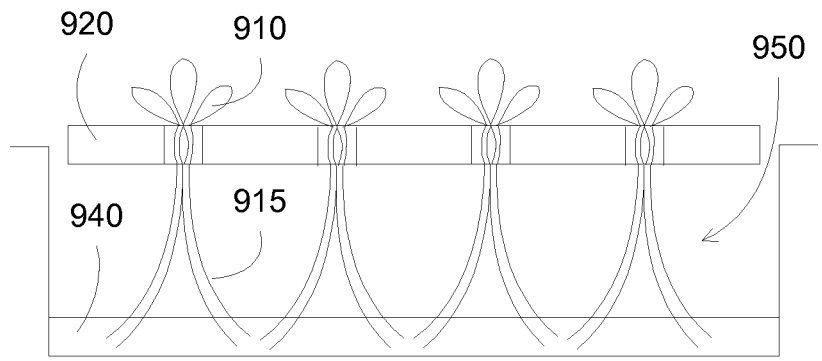
FIGS. 9A-9C illustrate configurations for root exposure according to some embodiments.
Figure 9B:
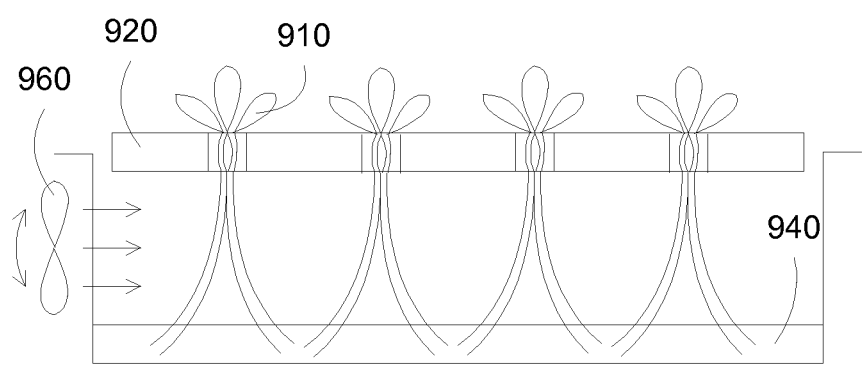
Figure 9C:
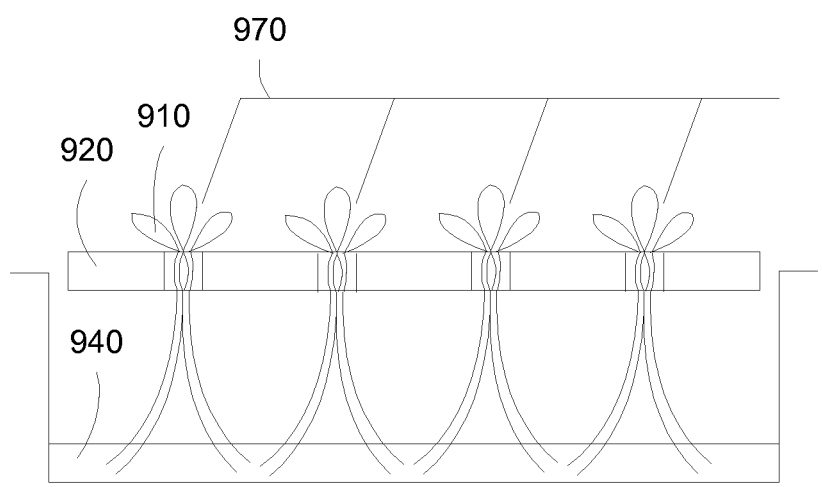

FIGS. 9A-9C illustrate configurations for root exposure according to some embodiments. In FIG. 9A, plants 910 can be supported by a plate support 920. To prevent or minimize evaporation of the liquid medium, there can be minimum gap between the plate support 920 and the container containing the liquid medium 940. The tips of the roots 915 of the plants 910 can be dipped in the liquid medium 940, leaving a portion 950 of the roots exposed to the air ambient. The plants 910 can be supported at the stem, for example, by the sponge supports, that are inserted into holes in the plate support 920. The air ambient can include oxygen and $CO_2$.

In FIG. 9B, a fan 960 can be used to bring fresh air to the exposed roots. Since the air ambient between the plate support 920 and the liquid medium 940 can be somewhat isolated from the outside ambient, oxygen and $CO_2$ can be depleted due to the absorption from the plant roots. Thus fresh air can be provided to the exposed roots from the outside ambient, for example, through the fan 960. The fan operation can be intermittent, for example, serving to exchange the air at the exposed roots.

In FIG. 9C, drip lines 970 can be provided to wet the stems and the exposed roots of the plants. Since the exposed roots are exposed to air, the roots and stems can be dried. Thus a liquid supply can be provided, for example, in the form of drip lines 970, to wet the exposed roots. The drip lines operation can be intermittent, for example, serving to wet the roots without interfering with the ability of the exposed roots to absorb nutrients from the air ambient.

In some embodiments, the alternation of root wetting and root exposing to air can be performed by raising and lowering the liquid levels, respectively. The liquid level can be adjusted, for example, to cyclically expose and wet the plant roots. For example, the liquid can be at a low level state, exposing a portion of the roots and wetting a tip of the roots. The liquid can be at a high level state, wetting the roots, up to the stem of the plants. The difference in liquid levels can be between 5 and 20 cm, such as between 10 and 15 cm. The alternating high and low liquid levels can exchange the air at the exposed root portion, allowing the exposed roots to be exposed to fresh air. The time for high liquid level can be between 10 and 25 the time for low liquid level. For example, the liquid can rise for 2-4 minutes, and then lower for 20-100 minutes, such as 40 to 60 minutes.

Figure 10A:
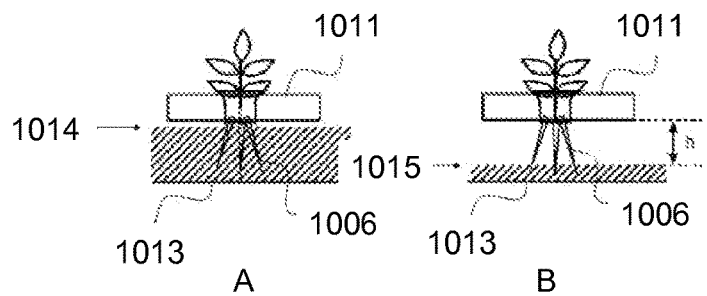
FIGS. 10A-10D illustrate cyclic operations of raising and lowering liquid levels according to some embodiments.

FIGS. 10A-10D illustrate cyclic operations of raising and lowering liquid levels according to some embodiments. In FIG. 10A, a hydroponics container 1013 can contain hydroponics liquid, such as water with dissolved nutrients. A plate support 1011 can be disposed on the container. Plants can be disposed in the plate support, for example, through the sponge supports as discussed above. In high liquid level 1014, the liquid can rise close to the plate support 1011, submerging and wetting almost all the roots 1006 of the plant. In low liquid level 1015, the liquid can lower close to the bottom of the container 1013, wetting only the tips of the roots 1006 of the plant, leaving a large portion of the roots exposed to air ambient. The difference between the high and low liquid levels can be between 5 and 20 cm, such as between 10 and 15 cm. The time for high liquid level can be between 10 and 25 the time for low liquid level. For example, the liquid can rise for 2-4 minutes, and then lower for 20-100 minutes, such as 40 to 60 minutes.

Figure 10B:
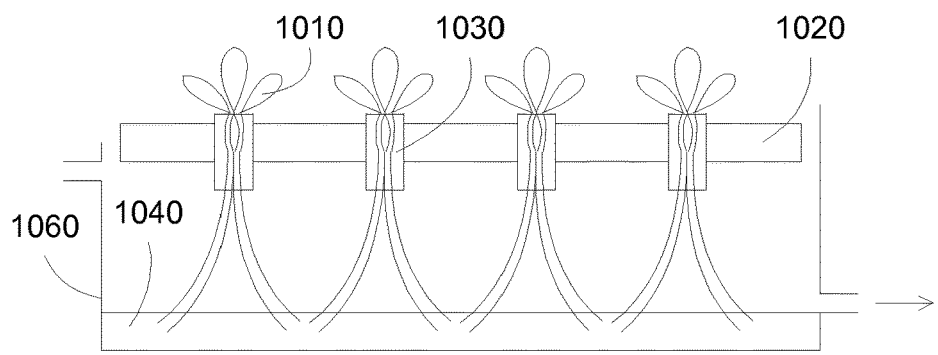
Figure 10C:
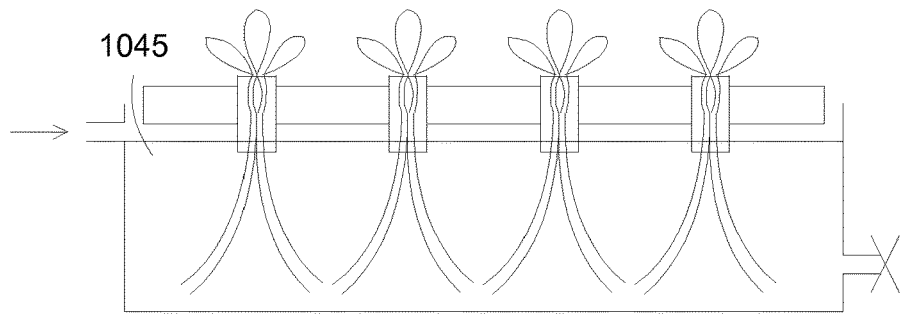
Figure 10D:
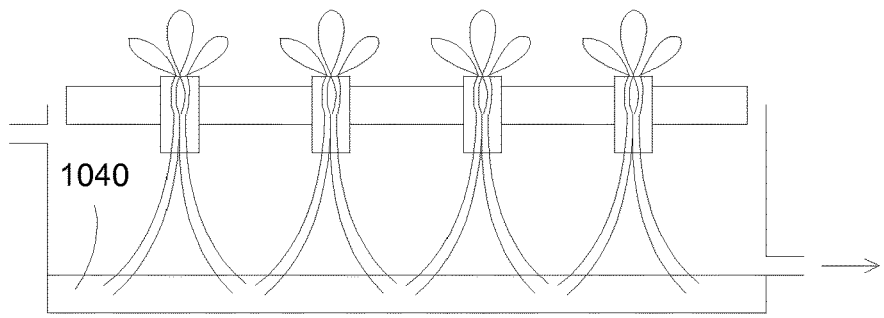

FIGS. 10B-10D show a sequence of changing liquid levels through liquid flowing to the container. A hydroponics container 1060 can contain hydroponics liquid, such as water with dissolved nutrients. A plate support 1020 can be disposed on the container. Plants 1010 can be disposed in the plate support, for example, through the sponge supports

1030. In FIG. 10B, the liquid can be drain out of the container, to obtain a low liquid level 1040. The low liquid level can allow the exposure of a portion of roots, together with wetting the tips of the roots. In FIG. 10C, the liquid can flow to the container, to obtain a high liquid level 1045. The high liquid level can wet the exposed portion of the roots. In some embodiments, the high liquid level can also wet the plant stems, for example, through the sponge support 1030. The wetting of the sponge support 1030 can hold the liquid so that the stem will not be dried out during the low liquid level phase. The change in the liquid level can be repeated. For example, in FIG. 10D, the liquid can be drain out of the container, to obtain a low liquid level 1040.

Figure 11A:
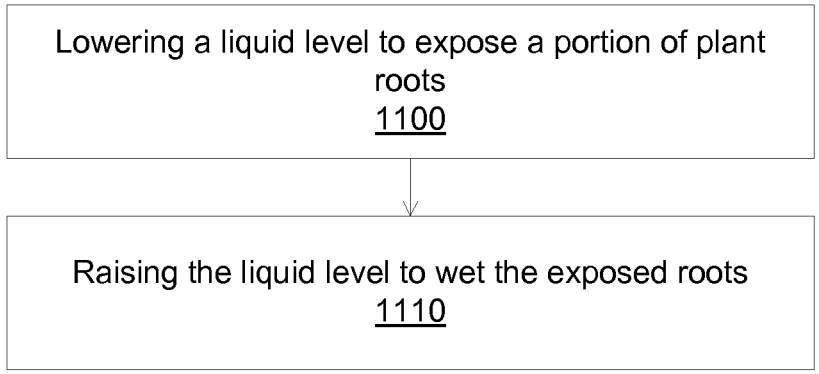
FIGS. 11A-11B illustrate flow charts for periodically exposing the plant roots according to some embodiments.
Figure 11B:
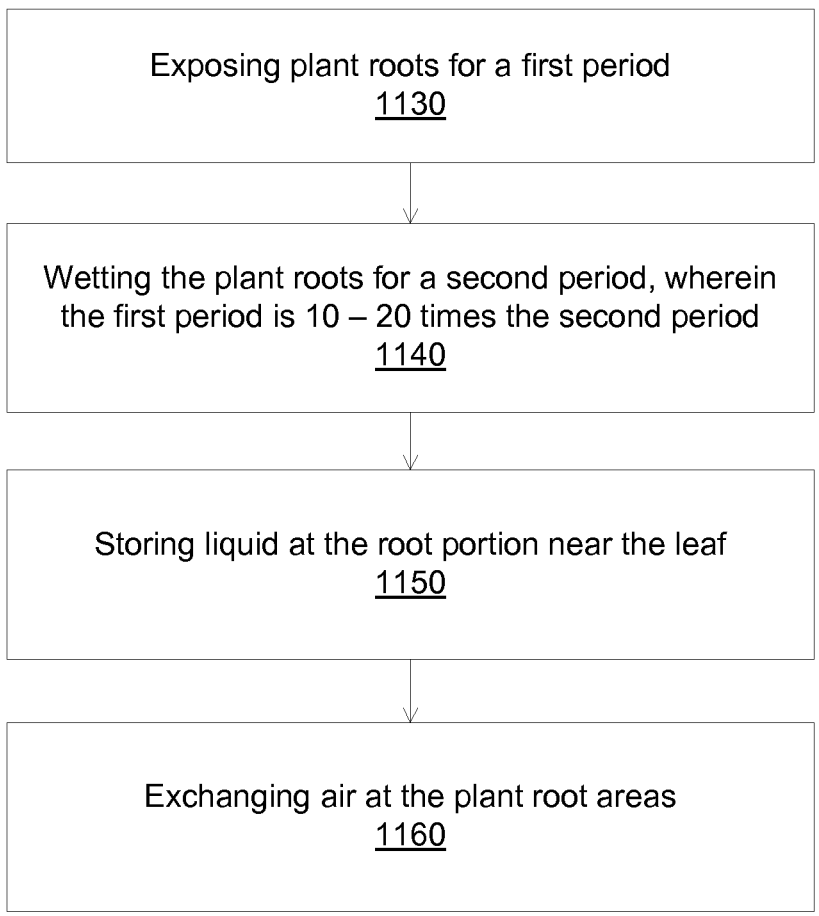

FIGS. 11A-11B illustrate flow charts for periodically exposing the plant roots according to some embodiments. In FIG. 11A, a cyclic changing of liquid levels can be performed to stimulate the plant growth by alternating wetting and exposing the plant roots. Operation 1100 lowers a liquid level, e.g., the hydroponics liquid that is used to provide nutrients to the plants. The liquid level is lowered to expose a portion of the plant roots, while still maintaining a wetting of the tips of the plant roots. Operation 1110 raises the liquid level to wet the exposed roots. The liquid level can be repeatedly lowered and raised. The difference in liquid levels can be between 5 and 20 cm, such as between 10 and 15 cm. The time for high liquid level can be between 10 and 25 the time for low liquid level. For example, the liquid can rise for 2-4 minutes, and then lower for 20-100 minutes, such as 40 to 60 minutes.

In some embodiments, the liquid level can be lowered to a fixed level. In this case, the tips of the roots might not be wetted, for example, when the plant is young and the roots are not long enough. When the plants are growing, the roots can be longer, and can reach the lower level of the liquid. The tip portion of the roots in the liquid can be longer when the roots grow. The exposure portion of the roots can be constant, e.g., the portion of the roots between the lower and upper levels of the liquid. In some embodiments, the fixed lower level of the liquid can be used for mixed plants, e.g., plants with different maturity levels. For example, a germinated plant can have a short root length. A mid-term plant can have medium root length. And a mature plant can have a long root length. A fixed lower liquid level can accommodate all types of plants with a constant exposure root length.

In some embodiments, the liquid level can be lowered to different levels. The low liquid level can be configured to wet the tips of the plant roots. For example, for young plants such as germinated plants, the low liquid level can be close to the high liquid level, in order to wet the tips of the roots. For mid-term plants, the low liquid level can be lower since the plant roots can be longer.

In FIG. 11B, operation 1130 exposes a portion of the plant roots for a first period. The tips of the plant roots can be wetted during the exposure. Operation 1140 wets the exposed roots for a second period. The first period can be 10-25 longer than the second period. Operation 1150 stores liquid to the stem portion of the roots, for example, by wetting the sponge supports. Operation 1160 exchanges the air at the exposed roots area, so that fresh air can replace the spent air, e.g., air that oxygen and $CO_2$ have been absorbed by the exposed roots.

The changing of the liquid levels can be accomplished by draining (to get the low liquid level), and by flowing liquid (to get the high liquid level), for example, by a liquid pump. Further, multiple shelves of hydroponics containers can utilize gravity for liquid flowing.

Figure 12:
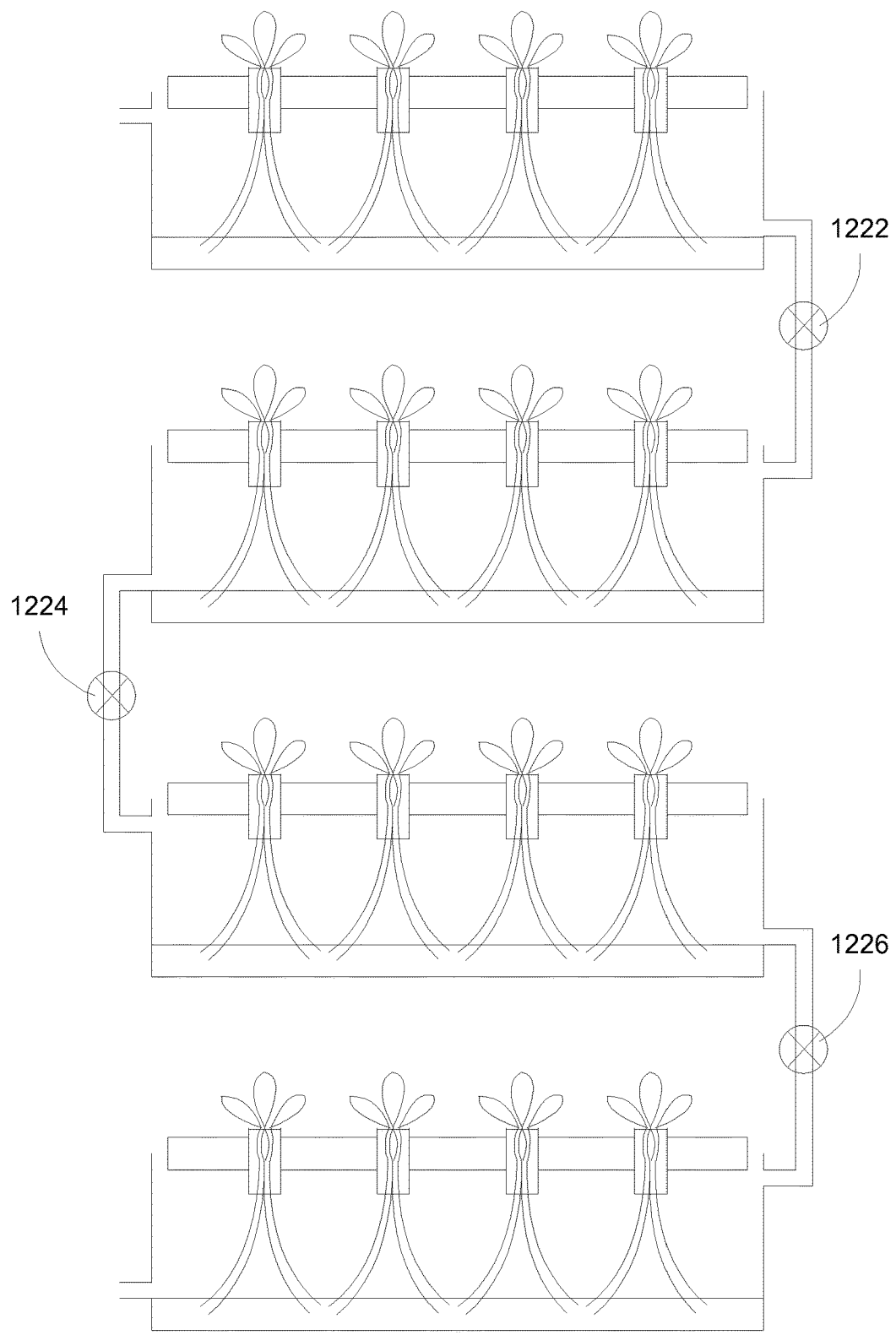
FIG. 12 illustrates a hydroponics system having multiple vertical shelves according to some embodiments.

FIG. 12 illustrates a hydroponics system having multiple vertical shelves according to some embodiments. Multiple shelves can be stacked in a vertical direction, for example, with one shelf on top of another shelf. The drain conduit of a higher shelf can be coupled to the supply conduit of a lower shelf through a valve. When the valve is open, the liquid from the top shelf can be drained to the bottom shelf. When the valve is close, the liquid in the shelves are isolated from each other.

For example, all valves can be open without any liquid input. The liquid level can be low for all the shelves, since the liquid from a top shelf can drain to the shelf below. The valves can be close, and liquid can be pumped to the top shelf, for example, from a reservoir, to reach the high liquid level. Valve 1222 then can be open. Liquid from the top first shelf can drain to the second shelf, raising the liquid level of the second shelf to the high level. Valves 1224 and 1226 can be open sequentially, to drain the liquid from the high shelves to the low shelves. The sequentially draining of the liquid can effectively raise the liquid level for a short time, before the liquid level returns to the low level.

Figure 13:
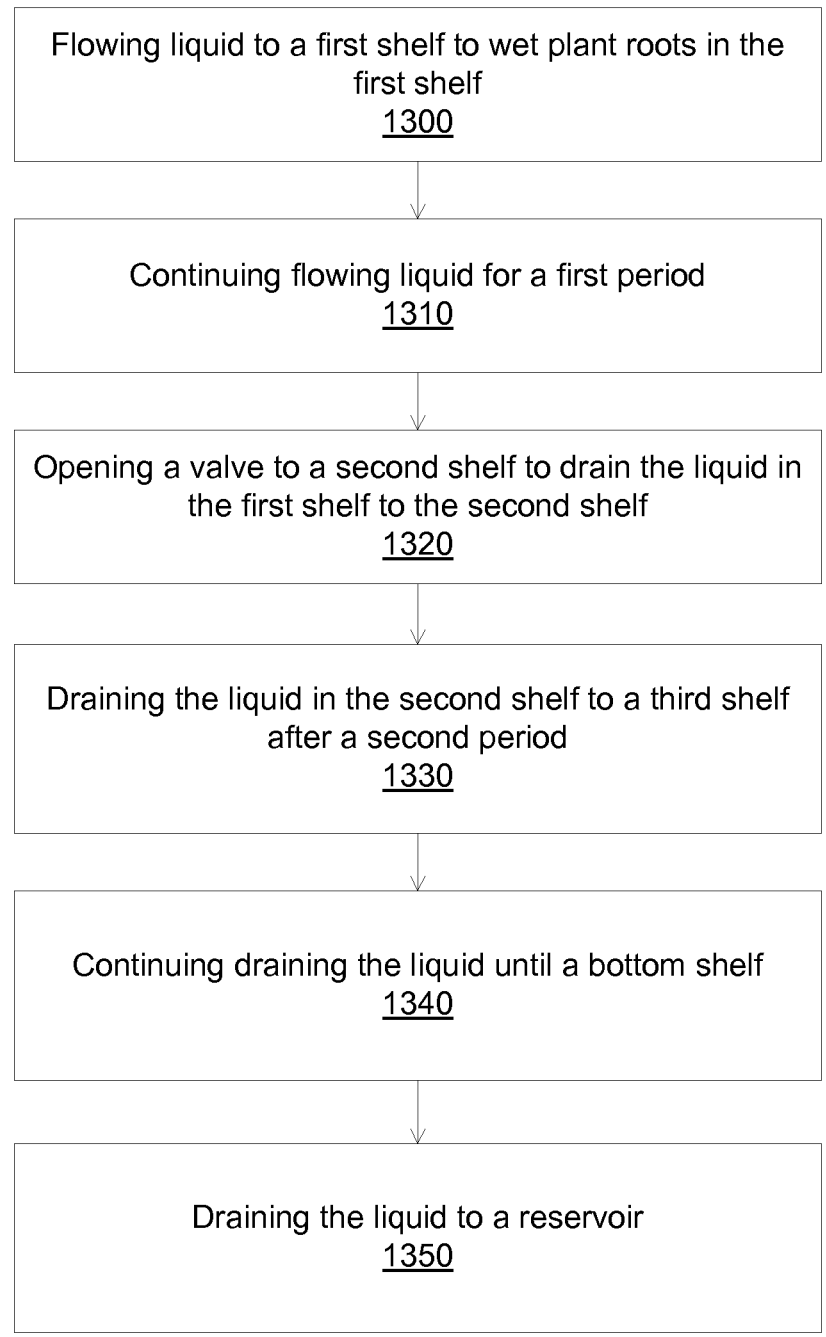
FIG. 13 illustrates a flow chart for liquid flow in a vertical stacked hydroponics system according to some embodiments.

FIG. 13 illustrates a flow chart for liquid flow in a vertical stacked hydroponics system according to some embodiments. A water pump can be provided to pump water to the highest shelf of hydroponics plants. The water then can flow sequentially to lower shelves. Operation 1300 flows liquid to a first shelf to raise the liquid level in the first shelf to a high level. The liquid can be pumped from a reservoir. The high liquid level can wet the plant roots in the first shelf. Operation 1310 continues to flow liquid for a first period, such as between 2 and 6 minutes. Operation 1320 opens a valve connecting a drain outlet of the first shelf to a supply inlet of a second shelf, which is immediately below the first shelf. After the liquid in the first shelf is drained to the second shelf, the liquid in the first shelf can be at low level state. The liquid in the second shelf can be at high level state, due to the liquid flowing from the first shelf. The liquid can stay in the second shelf for a second period, such as between 2 and 6 minutes. Operation 1330 drains the liquid in the second shelf to the third shelf. Operation 1340 continues draining the liquid until the bottommost shelf. Operation 1350 drains the liquid from the bottommost shelf to the reservoir.

After a time, the liquid can be pumped from the reservoir to the first shelf. The time can be calculated so that the low liquid level can be between 10 and 25 times the high liquid level. For example, if the high liquid level is between 2 and 6 minutes, then the low liquid level can be between 20 and 150 minutes. The time waiting between liquid pumping from the reservoir can be the low liquid level time minus the time that the liquid travels from the top shelf back to the reservoir. The waiting time can be between 5 and 135 minutes, or can be between 30 and 70 minutes, or can be between 40 and 60 minutes.

In some embodiments, the present invention discloses hydroponics systems and methods that include swinging the roots of the hydroponics plants. The swing of the plant roots can include the top portion of the roots, e.g., near or including the stem of the plants. The oscillatory movements of the plant roots can promote the plant growth. The swinging action can be provided by generating waves in the liquid medium, or by periodically oscillating the liquid medium. Mechanical oscillation, or fluid movement mechanism such as Venturi effect or siphoning effect can be used to create waves. For example, by draining the liquid through a siphon mechanism, waves can be generated in the hydroponics container.

In some embodiments, provided are methods and systems for allowing the swing of the roots near the stem of the plants. The plants can be supported at the stem while leaving the roots free to move. Sponge supports, as discussed above, can be suitable for holding the plants with free movements of the roots, while allowing the plants to grow. The root swing can be performed while the roots are completely or partially submerged in the liquid medium. For example, the stem of the plants can be supported by the sponge support, with the top portion of the roots exposed to the air ambient and the tip portion of the roots dipped in the liquid medium. Waves from the liquid medium can swing the roots to enhance plant growth.

In some embodiments, provided are methods and systems for a swinging operation of the plant roots. The plant roots can be periodically sway to and from. The swinging period can be between 10 to 150 minutes, such as between 20 and 100 minutes, or between 40 and 60 minutes. At each swing action, the plant roots can swing back and forth a few times, such as less than 20 times, or between 2 and 6 times, or about 4 times.

Figure 14A:
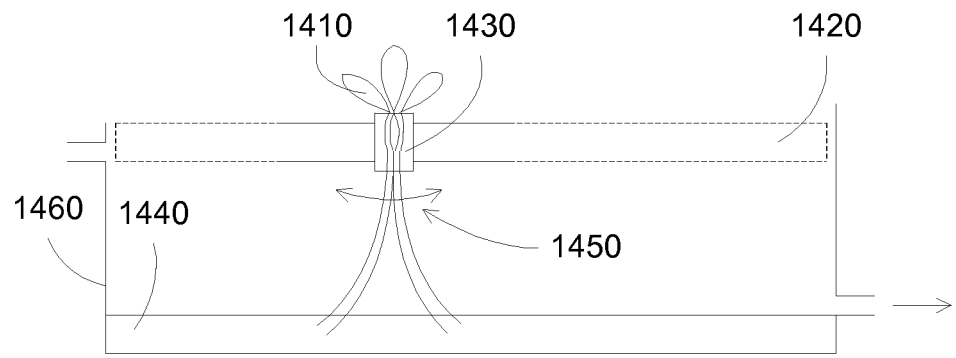
FIGS. 14A-14C illustrate hydroponics configurations for swinging plant roots according to some embodiments.
Figure 14B:
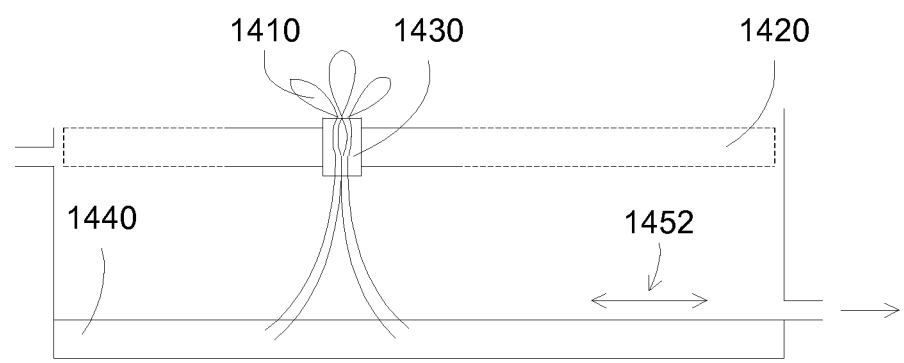
Figure 14C:
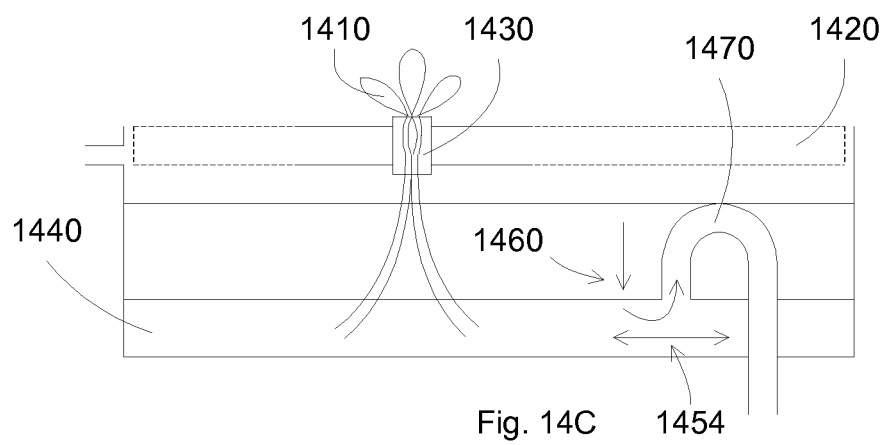

FIGS. 14A-14C illustrate hydroponics configurations for swinging plant roots according to some embodiments. The plants can be supported at the stem, allowing most of the roots free to move. The support can be compressible, which can allow the plants to grow. In FIG. 14A, a hydroponics container 1460 can contain hydroponics liquid, such as water with dissolved nutrients. A plate support 1420 can be disposed on the container. Plants 1410 can be disposed in the plate support, for example, through the sponge supports 1430. The liquid can be drained out of the container, to obtain a low liquid level 1440. The low liquid level can allow the exposure of a portion of roots, together with wetting the tips of the roots. The plant roots can swing back and forth 1450, for example, due to the movements of the liquid 1440 or due to the movements of the air surrounding the exposed roots.

In FIG. 14B, liquid movements 1452 can be generated in the liquid 1440, which can cause the roots to swing back and forth. The liquid movements can be generated by a mechanical mechanism such as a propeller or a moving plate. The liquid movements can be reflected from the walls of the container, causing the roots to oscillate in both directions.

In FIG. 14C, liquid movements 1454 can be generated by a draining 1460 of the liquid. A siphon tube 1470 can be used as a drain mechanism. The liquid can be drained out of the container. When the liquid level reaches the opening of the siphon tube, the siphoning effect can cause waves in the liquid, which then propagate from one side to the opposite side of the container. The reflection of the waves at the container walls can cause the roots to swing back and forth, which can enhance the plant growth.

FIGS. 15A-15C illustrate flow charts for hydroponics roots swinging according to some embodiments. A hydroponics system can have a container having a liquid medium disposed within. Hydroponics plants can be placed above the liquid level so that the plants can absorb liquid nutrients from the liquid.

In FIG. 15A, operation 1500 periodically swings the plant roots. In FIG. 15B, operation 1520 periodically oscillates the liquid sideway. The movements of the liquid can cause the plant roots to oscillate, e.g., swinging back and forth. In FIG. 15C, operation 1540 periodically drains the liquid through a siphon tube. The liquid draining action can cause the plant roots to oscillate, e.g., swinging back and forth.

In some embodiments, the plant roots can oscillate a few times, for example, between 2 and 10 times or between 3 and 5 times in every 80, 60, 40 minutes, or any time between 20 and 100 minutes. Other elements and components can be added for the operation of the hydroponics system, such as spreading the plants, exposing a portion of the plant roots, and periodically lowering and raising the liquid level.

Figure 16:
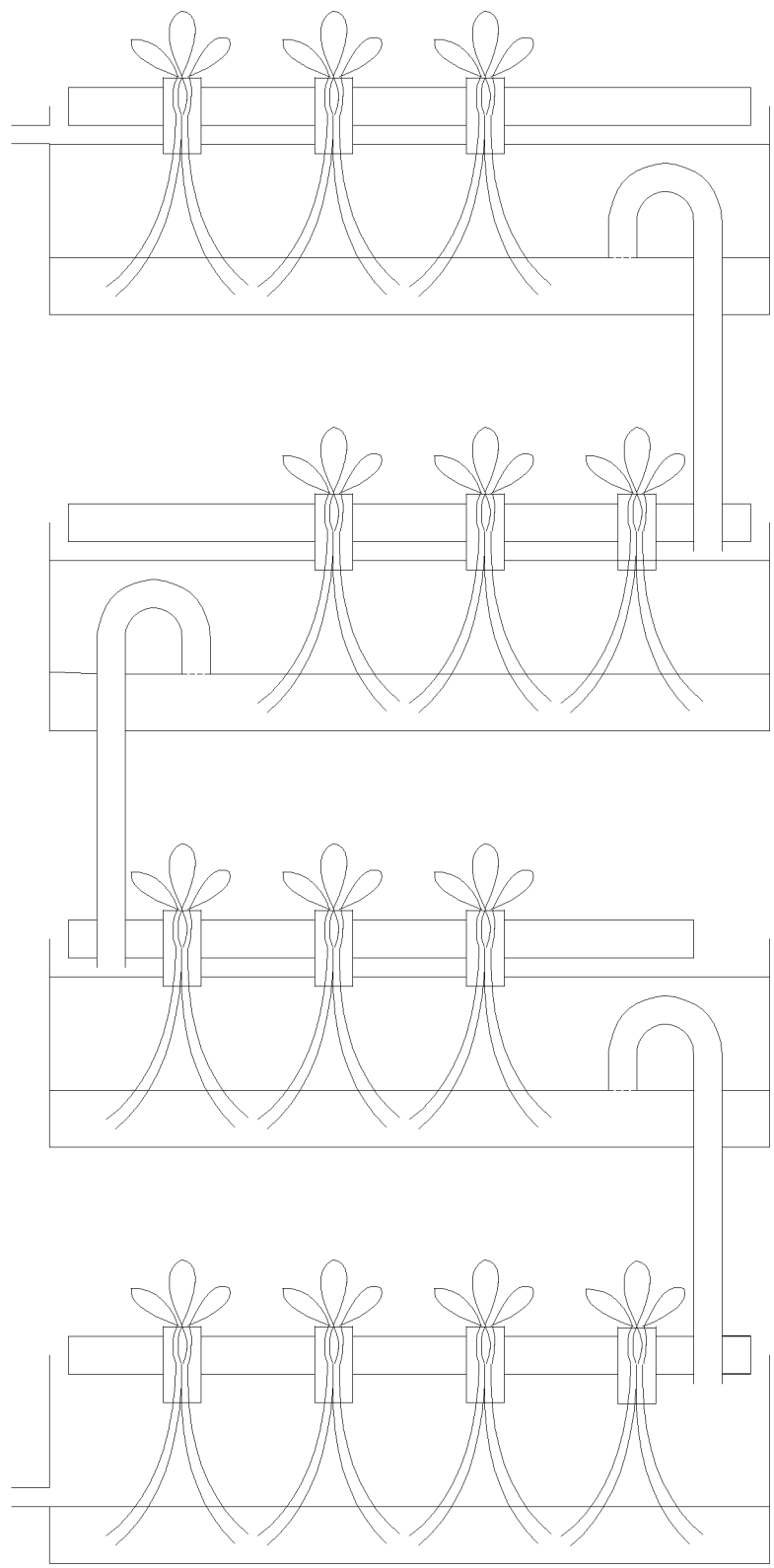
FIG. 16 illustrates a hydroponics system having multiple vertical shelves according to some embodiments.

FIG. 16 illustrates a hydroponics system having multiple vertical shelves according to some embodiments. Multiple shelves can be stacked in a vertical direction, for example, with one shelf on top of another shelf. The drain conduit of a higher shelf can have a siphon configuration, and can be drained to a lower shelf. When the liquid is drained from a higher shelf to a lower shelf, the siphoning effect can cause the liquid to generate a few cycles of wave oscillation, which can swing the plant roots to enhance the plant growth. The liquid can be sequentially drained, from the topmost shelf to the bottommost shelf. At any draining shelf, the siphoning effect can cause ripples in that shelf, which can swing the plant roots. The number of root swinging can be a function of the length of the container, and the siphon dimensions, which can be between 2 and 10 complete cycles, e.g., 2-10 back and forth root swinging. The period of the swinging action can be determined by the period of the pumping action, with every pumping cycle corresponded to a swinging action.

In some embodiments, the present invention discloses hydroponics systems and methods that include high vertical hydroponics shelf stacking. Low liquid levels and low light intensities can be used in the production of hydroponics plants, allowing higher vertical stacking with lighter structural supports.

The vertical stacking of hydroponics plants can lead to a large amount of plants in a small cultivation chamber. The vertical stacked hydroponics system can be light weight, allowing high stacking density for low structural strength. The low weight of the vertical hydroponics system can be achieved by the low level of liquid medium, e.g., liquid levels to wet the tips of the plant roots with a portion of roots exposed to air. Low liquid levels can reduce the amount of water, leading to lighter hydroponics shelves. The low weight of the vertical hydroponics system can also be achieved by the low light intensity of the lightning systems, which can be due to the spreading of the plants.

Figure 17:
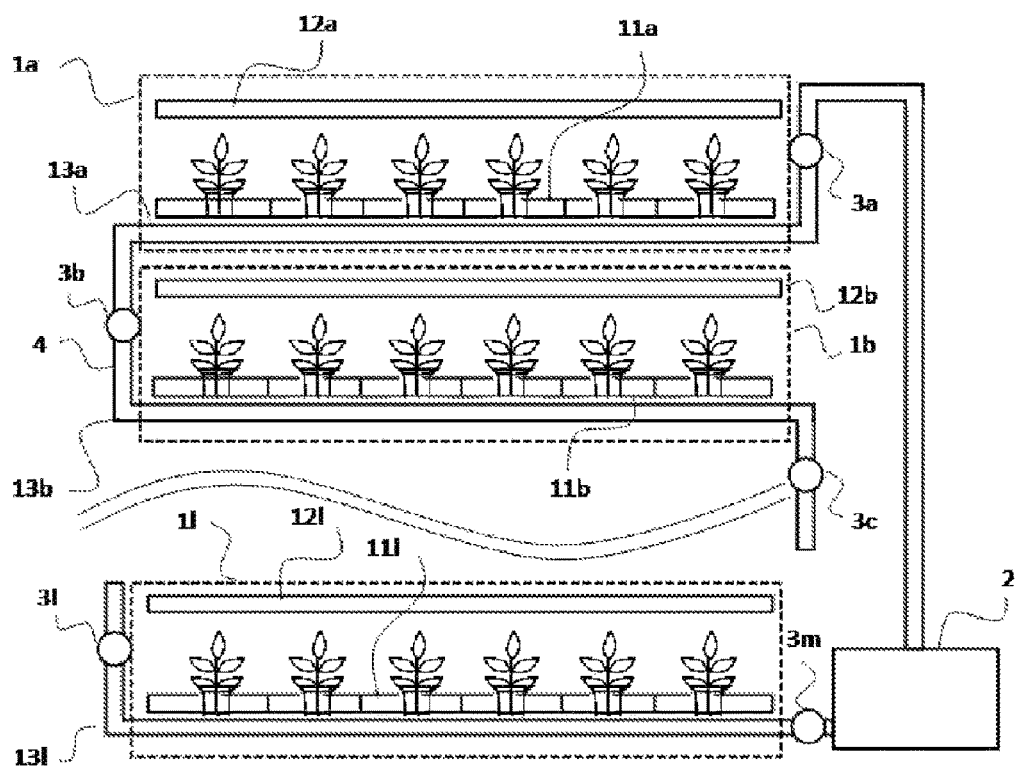
FIG. 17 illustrates a vertical structure of a hydroponics unit according to some embodiments.

FIG. 17 illustrates a vertical structure of a hydroponics unit according to some embodiments. The hydroponics unit can include cultivation shelves 1a, 1b, . . . , 1l. The uppermost cultivation shelf 1a can include cultivation board, e.g., plate support, 11a, water supply passage 13a and the light source 12a. Pot to grow the plants are placed in the cultivation board 11a, which is placed above the water supply path. The plant roots can be dipped in the water in the water supply path. Water supply path 13a can be an open container, such as a gutter in which the water can easily flow. Other cultivation shelves 1b-1l can be similarly constructed.

Water supply path 13 of two adjacent cultivation shelves can be connected by a water supply connection path 4, configured so that the water of water supply path of the upper shelf can flow into the water supply path of the lower shelf. Valve 3b is provided in the water supply connection path 4, which connects the water supply paths 13a and 13b. Valve 3b can control the flow of water between the water supply path 13a and 13b. Similarly, valves 3c~3l can be provided to control the flow of water between lower cultivation shelves.

Further, valves 3m and 3a can be provided to connect a water tank 2 between the lowest water supply path 13l to the highest water supply path 13a. A drive mechanism can be used to control valves 3a~3m, for example, to adjust the amount of water in the water supply passage 13a~13l of each stage. A pump can be used to pump water from the water tank 2 to the top cultivation shelf.

Figure 18:
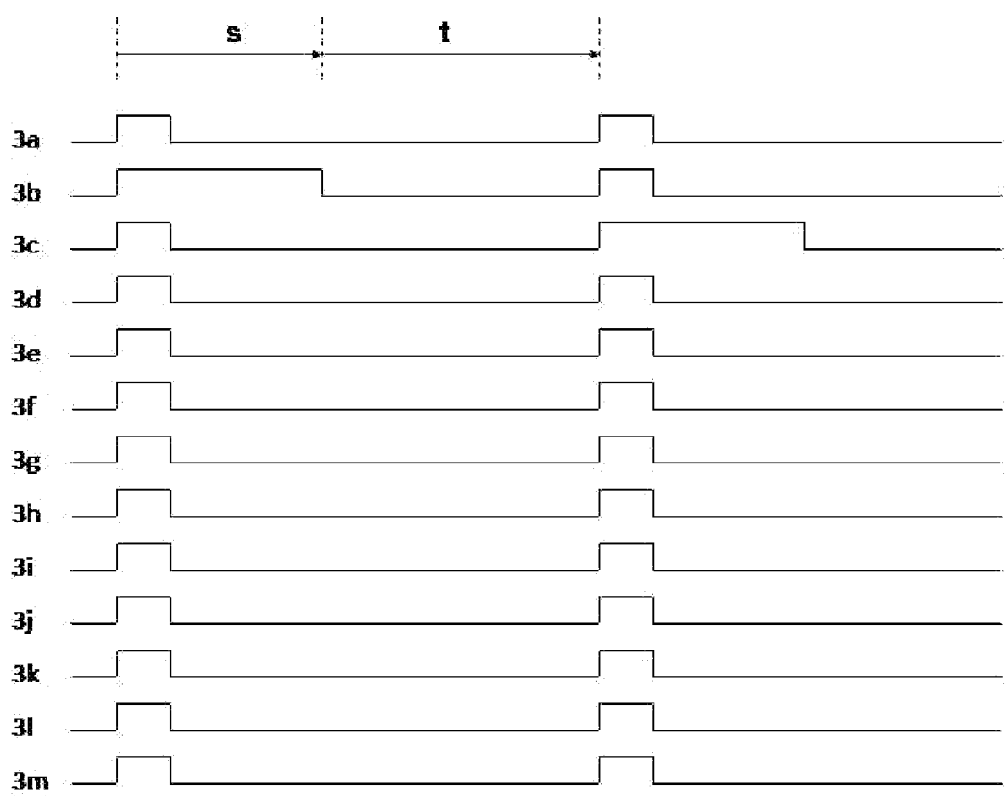
FIG. 18 illustrates a diagram showing the control of the valves in the hydroponics unit according to some embodiments.

FIG. 18 illustrates a diagram showing the control of the valves in the hydroponics unit according to some embodiments. The lines represent the valve operations, with each line representing a valve of the hydroponics unit. The horizontal axis represent time. The vertical axis represents the states of the valves, with upper value showing the valve in open state and lower value showing the valve in close state.

Normally, the water levels of the cultivation shelves are at low level states, with the tips of the plant roots dipped in the water and a top portion of the plant roots from the stems of the plants exposed to air ambient. Periodically, the water can be pumped to the cultivation shelves, to bring water levels to the high level states.

To start the pumping action, all valves connecting the pump and the cultivation shelves, e.g., valves 3a-3m are open. The water can be pumped from the water tank to the top cultivation shelf, and travels to the lower shelves back to the water tank. The flow conduction can be configured so that there is a high flow to the top shelf, while there is much lower flow to the lower shelves. Thus the water level in the top shelf can rise to the high level state, while the water levels in the lower shelves can be at the low water level state.

After the water level in the top shelf reaches the high level state, the water pump can stop, together with all connection valves except valve 3b, which connects top shelf to the next shelf. The water in the top shelf can drain to the next shelf, reducing the water level from the high level state to low level state. Consequently, water level in the next shelf, e.g., the shelf immediately below the top shelf, can rise from the low water level state to high level state. The process can continue, for example, valve 3c can be open to allow water to drain from the second shelf to the third shelf, followed by opening valve 3d, . . . , until the water reaches the bottom shelf, and then returns to the water tank.

In some embodiments, all the valves can be open with the pump running for a short time of the water flow time from the second shelf to the third shelf, e.g., when valve 3c is open. This can supplement the water flow from the second shelf to the third shelf, helping the water level of the third shelf to reach the high level state.

After the valves are open, they can be close to stabilize the water levels. The closing time t can be chosen to be sufficiently longer than the open time s. For example, s can be less than 1 minute and t can be about 10 minutes. By choosing s to be much less than t, approximate value can be used by ignoring the time s. In some embodiments, the low level state can be 11 times out of 12 times, with the 12th time being the high level state.

Figure 19:
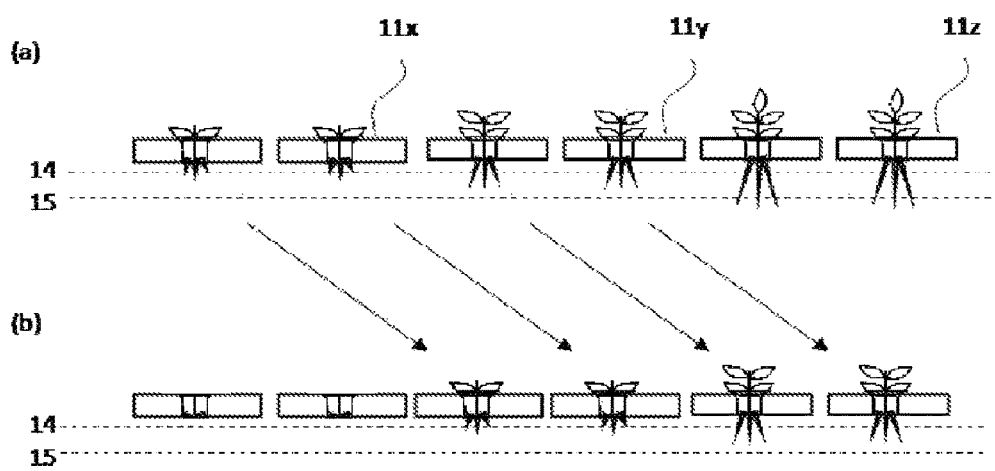
FIG. 19 illustrates a configuration for plant replacement according to some embodiments.

FIG. 19 illustrates a configuration for plant replacement according to some embodiments. Cultivation boards 11x, 11y, and 11z show different development stages of the target crop plants (FIG. 19a), and are arranged in order of plant growth. Board 11z shows more mature plants than board 11y, which shows more mature plants than board 11x. Further, different plant density can be used in different board. For example, board 11x can accept 30 plants, while board 11y can accept 4 plants, and board 11z 1 plant.

After the plants in board 11z can grow to a size that can be shipped, cultivation board 11z is removed. Board 11y can be thinned out, leaving the plants with the most rigorous growth. Board 11y can be moved to the right, for example, replacing board 11z. Similarly, board 11x can be thinned out, and moves to the right side. A new board can be placed at the original place of board 11x.

In some embodiments, three types of board can be used, 30 plant board, 4 plant board, and 1 plant board. Other configurations can also be used, such as 30/6/2 plants, or more than 3 types of board.

In FIG. 19, it is noted that indicator line 14 may be a level, wherein the fluid is raised to a high water level and indicator line 15 may be a level wherein the fluid is at a low water level.

With the present hydroponics systems and methods, high plant yield can be achieved with low consumable costs. For example, 200 g of lettuce can be harvested from a lettuce seed after 30 days with about 10,000 lux of light.

What is claimed is:

1. A hydroponics system, comprising:
one or more plants, each with one or more roots;
a light source;
a container,
    wherein the container is partially filled with a liquid medium;
one or more plate supports comprising
    at least one foam support positioned above the container,
        wherein a thickness of the one or more respective plate supports is smaller than a height of the at least one foam support and wherein the foam is made of a sponge-like material;
        wherein the one or more plants, with one or more roots, is placed in the system above the one or more plate supports, such that the at least one foam support supports and holds a respective one of the one or more plants, such that the one or more plants are stationary but the roots are able to swing below the one or more plate supports;
at least one hole disposed in each of the one or more plate supports to,
    accommodate a respective one of the at least one foam support,
        wherein a plant density of a respective plate support comprising young plants is configured at a predetermined value,
        wherein the plant density of a respective plate support comprising mature plants is configured lower than the predetermined value,
        wherein the density and maturity of the plants on a given group of plate supports is configured by one or more individual plate supports in the given group which each have a respective density and maturity,
        wherein the liquid medium is periodically raised by a pump to completely wet the root, wherein the liquid medium is cycled from a fluidly connected liquid supply, wherein the liquid medium is drained by a siphon drain configured to form an oscillating drain, such that the siphon creates a wave in the liquid medium causing the roots to swing with an oscillating action, and
        wherein the periodically raised liquid medium wets the at least one foam support.

2. The hydroponics system of claim 1, further comprising:
wherein a hole density of the plate support is configured at a predetermined value for at least one plant of a predetermined size.

3. The hydroponics system of claim 2, further comprising:
wherein a hole density of at least one other plate support is configured to be lower for at least one plant of a larger size.

4. The hydroponics system of claim 1, further comprising:
a tip portion of a root of at least one plant contacts the liquid medium to receive at least one nutrient through the tip portion, and
wherein an upper portion of the root is exposed to air.

5. The hydroponics system of claim 1, further comprising:
the at least one foam support comprising at least one of:
a small foam support and
a large foam support.

6. The hydroponics system of claim 5, further comprising:
wherein the at least one small foam support is fitted within the at least one large foam support.

7. The hydroponics system of claim 1, further comprising:
wherein the at least one wet foam support moisturizes a stem portion of at least one plant during a low liquid level.

8. The hydroponics system of claim 1, further comprising:
wherein at least one plant is positioned to minimize leaf overlap when two or more plants are present in the system.

9. The hydroponics system of claim 8, further comprising:
wherein the at least one foam support comprises at least one of a small foam support and a large foam support.

10. The hydroponics system of claim 9, further comprising:
wherein the at least one small foam support is fitted within the at least one large foam support.

11. A hydroponics system, comprising:
one or more plants, each with one or more roots;
a light source;
a container comprising a liquid medium;
a plate support positioned above the container comprising,
at least one foam support,
wherein the plate support includes at least one hole disposed in the plate support to accommodate the at least one foam support;
wherein the at least one foam support comprises a small foam support comprising a cut in a top surface for insertion of at least one plant seed, or
wherein the at least one foam support comprises a small foam support comprising a cut in a top surface for insertion of at least one plant seed, and a large foam support comprising a cut in a top surface for insertion of the at least one small foam support;
wherein the at least one foam supports is made of a sponge-like material;
wherein the one or more plants, with one or more roots is placed in the system above the plate support, such that the at least one foam support supports and holds the plant, such that the plant is stationary but the roots are able to swing below the plate support;
wherein the density and maturity of the plants on a given group of plate supports is configured by one or more individual plate supports in the given group which each have a respective density and maturity; and
wherein a liquid medium is cycled from a fluidly connected liquid supply by a pump and wherein the liquid medium is drained by a siphon drain configured to form an oscillating drain, such that the siphon creates a wave in the liquid medium causing the roots to swing with an oscillating action.

12. The hydroponics system of claim 11, further comprising:
wherein a hole density of the plate support is configured at a predetermined value for at least one plant of a predetermined size, and
wherein a hole density of at least one other plate support is configured to be lower for at least one plant of a larger size.

13. A method of germinating at least one plant seed in a small foam support using the hydroponics system of claim 11, the method comprising:
fitting the small foam support comprising at least one plant into the large foam support,
wherein the large foam support supports the at least one plant at a stem portion of the at least one plant when the small foam support comprising the at least one plant is fitted into the large foam support;
supporting the large foam support comprising the small foam support at the plate support; and
periodically oscillating a liquid medium to swing a top portion of a root of the at least one plant to promote plant growth.

* * * * *